July 4, 1933.  F. McCARTHY  1,916,847
GATHERING AND INSERTING MACHINE
Filed June 18, 1926  12 Sheets-Sheet 1

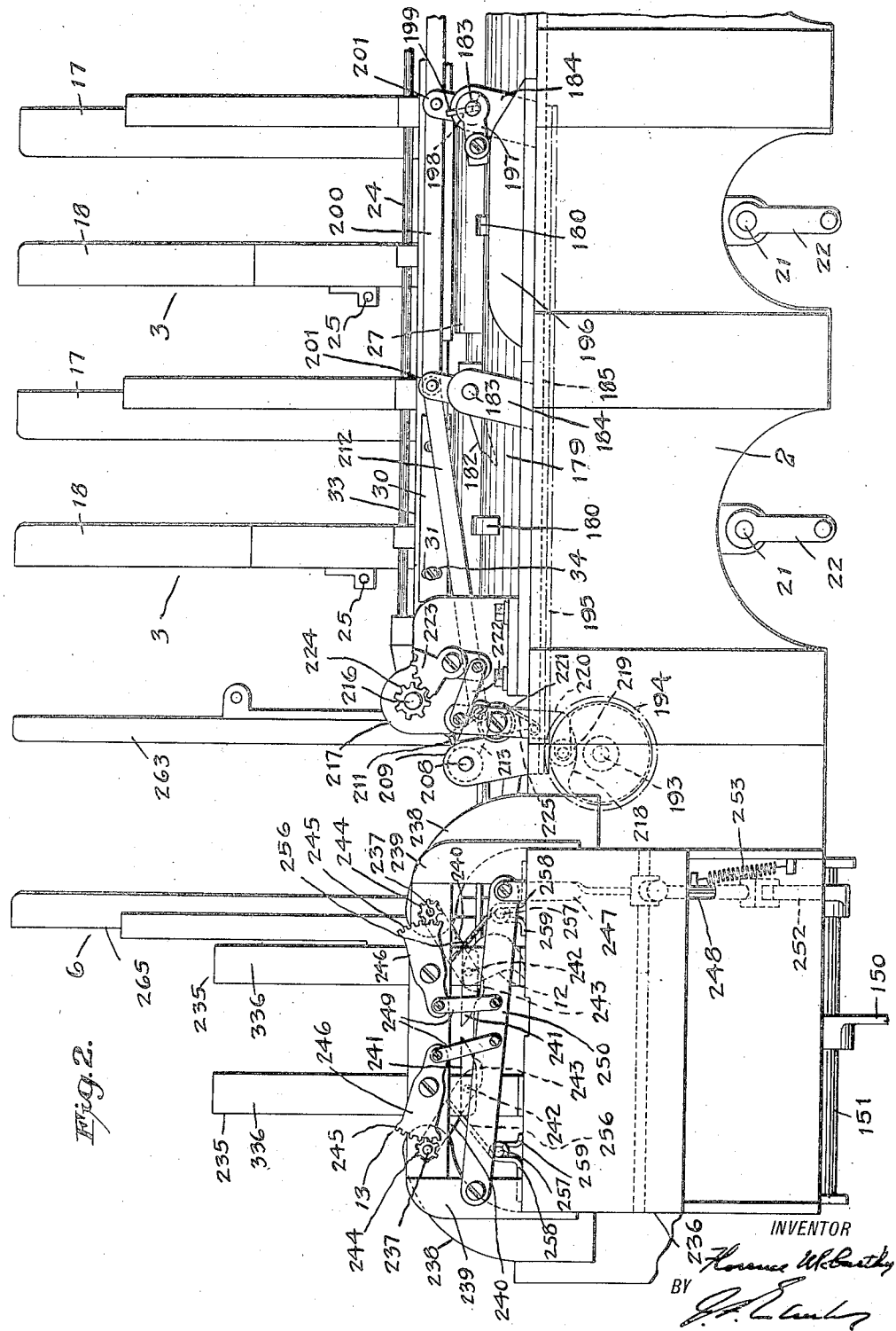

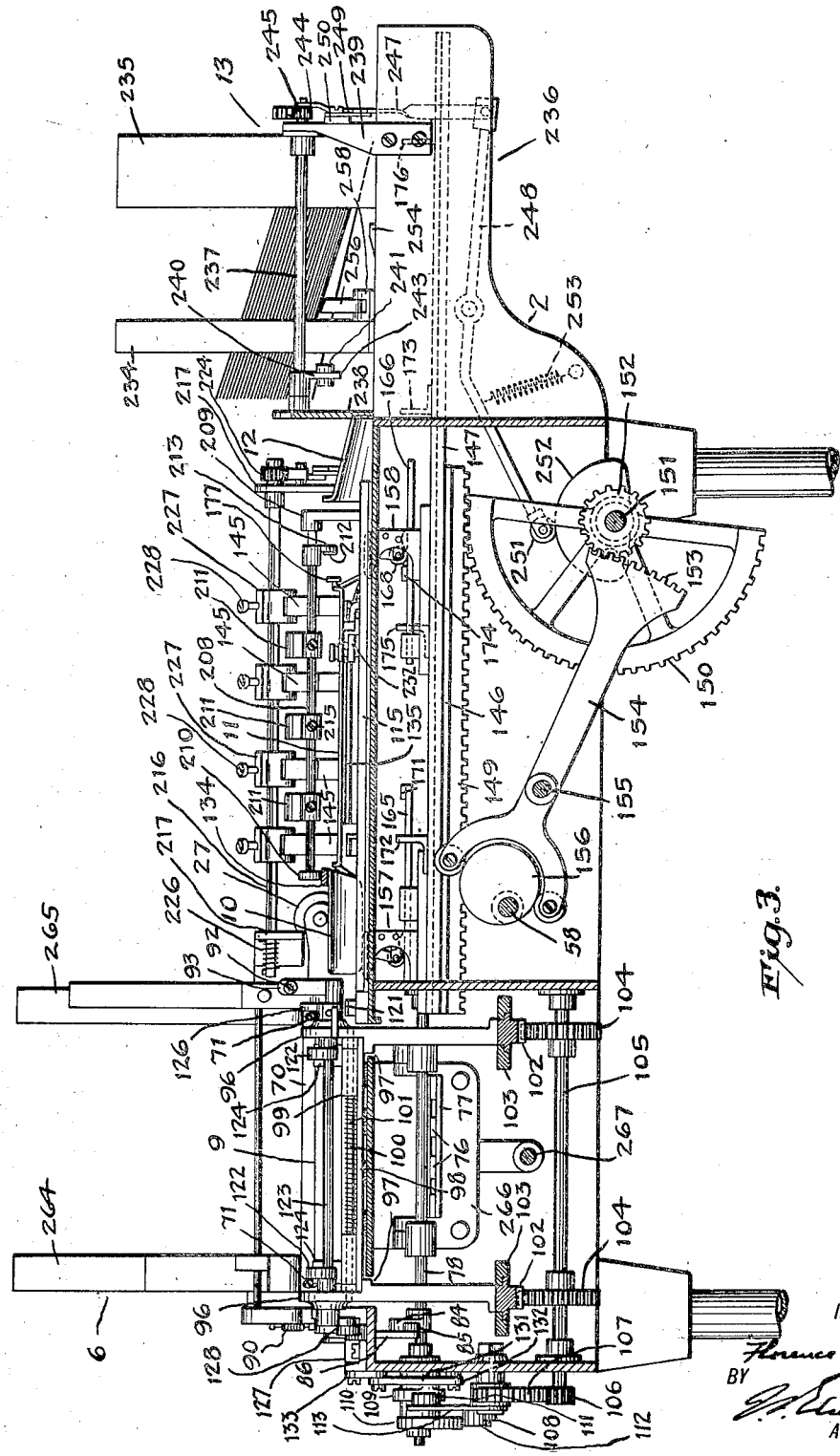

July 4, 1933.  F. McCARTHY  1,916,847
GATHERING AND INSERTING MACHINE
Filed June 18, 1926   12 Sheets-Sheet 4
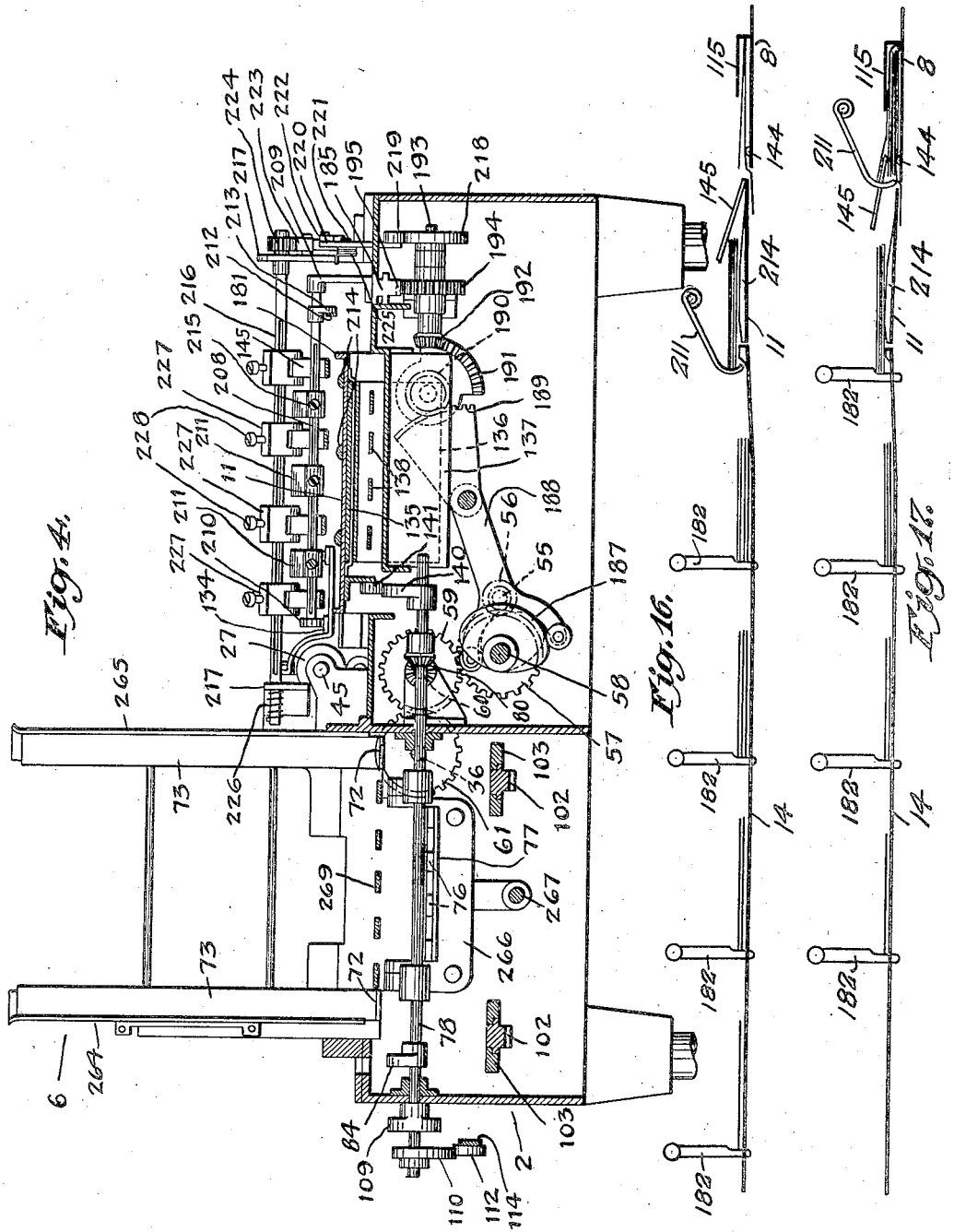
INVENTOR
BY
ATTORNEY

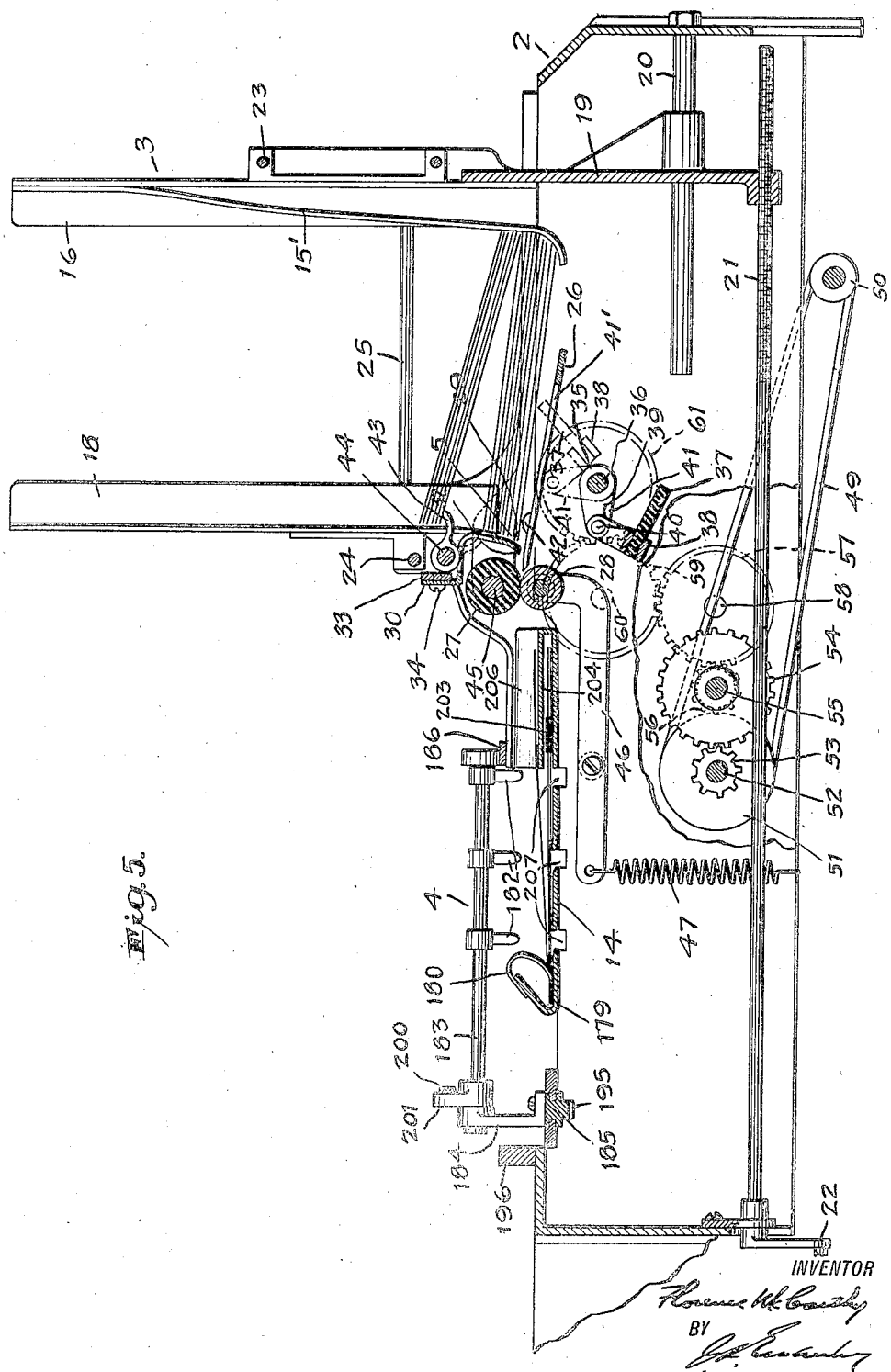

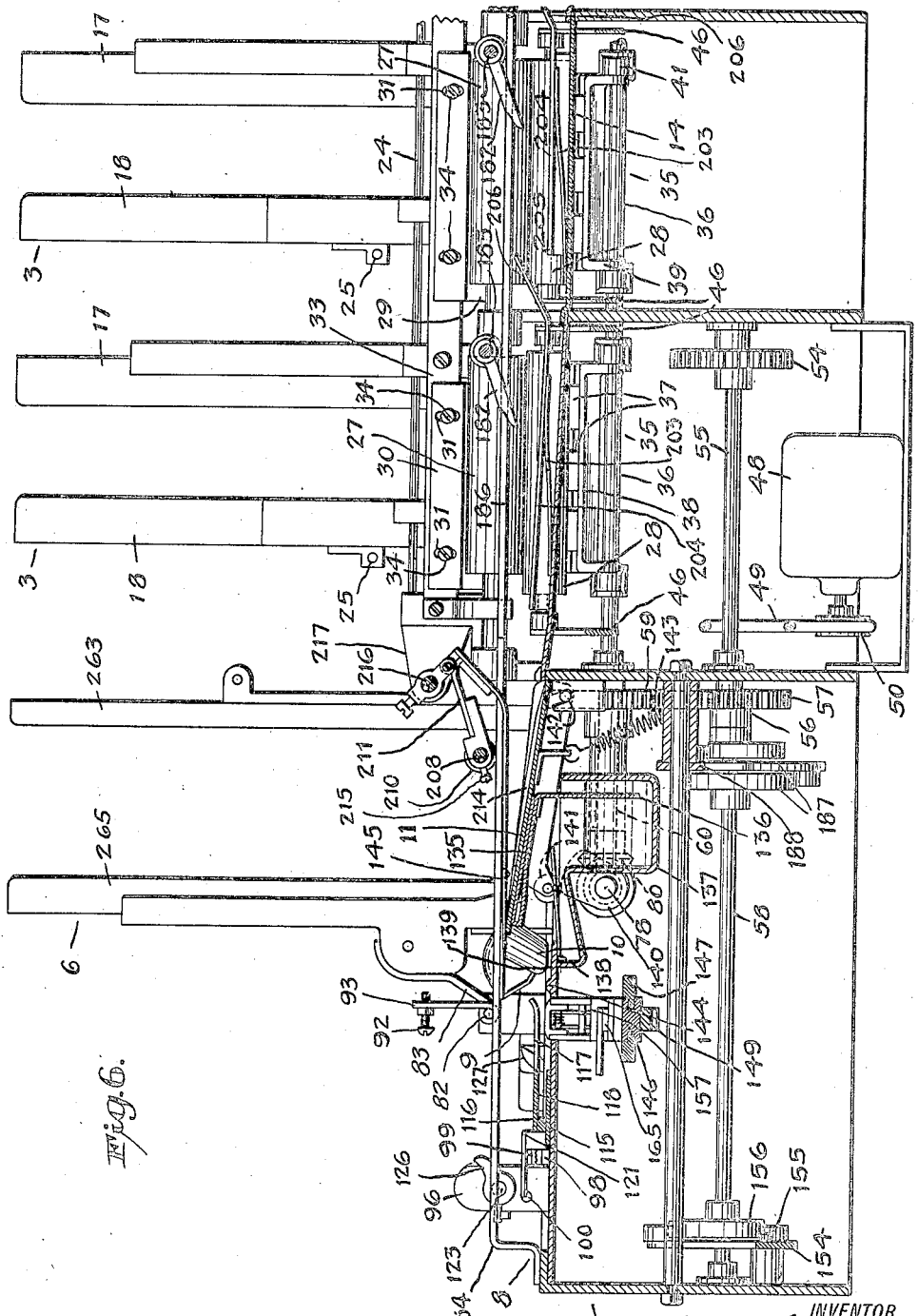

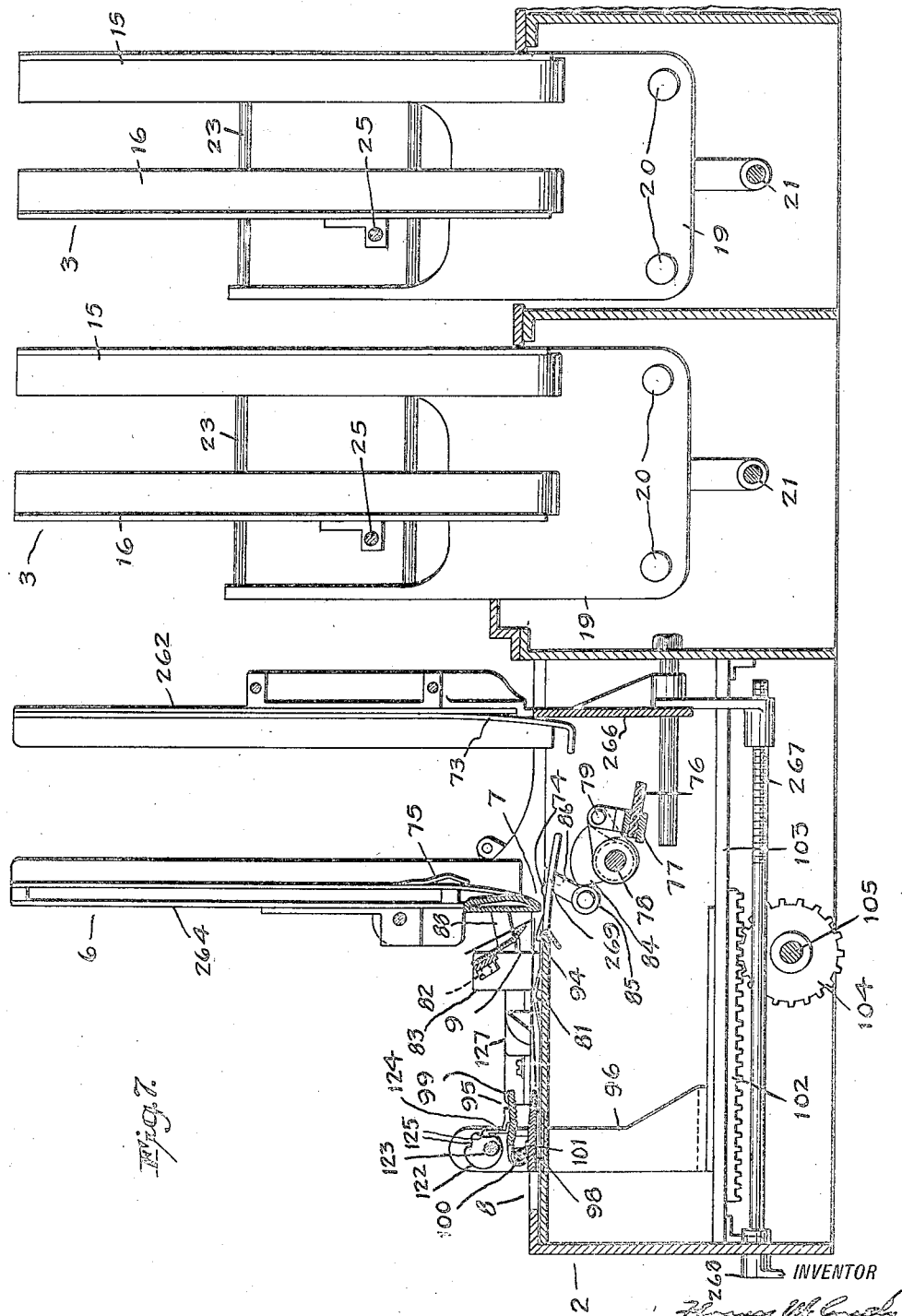

July 4, 1933.　　　　　　F. McCARTHY　　　　　　1,916,847
GATHERING AND INSERTING MACHINE
Filed June 18, 1926　　12 Sheets-Sheet 8
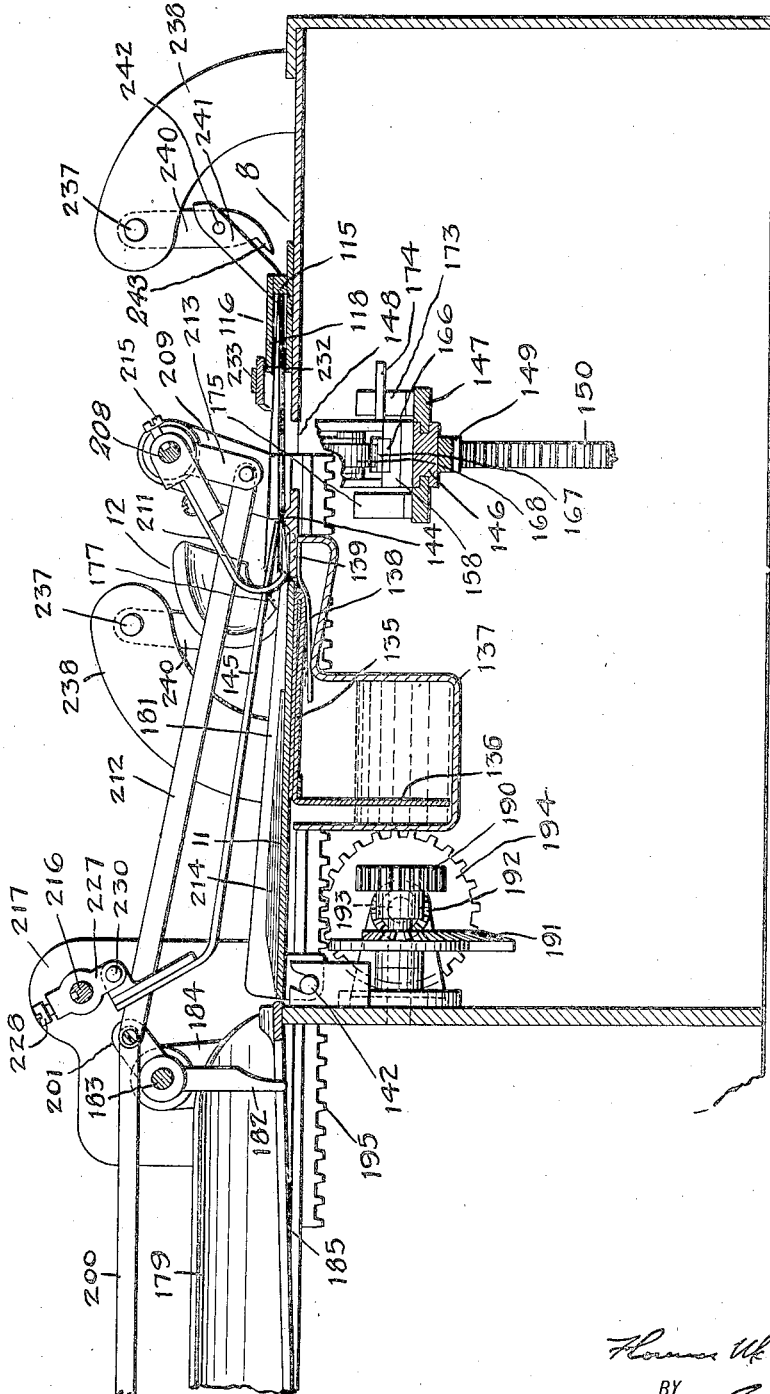
INVENTOR
Florence McCarthy
BY
ATTORNEY

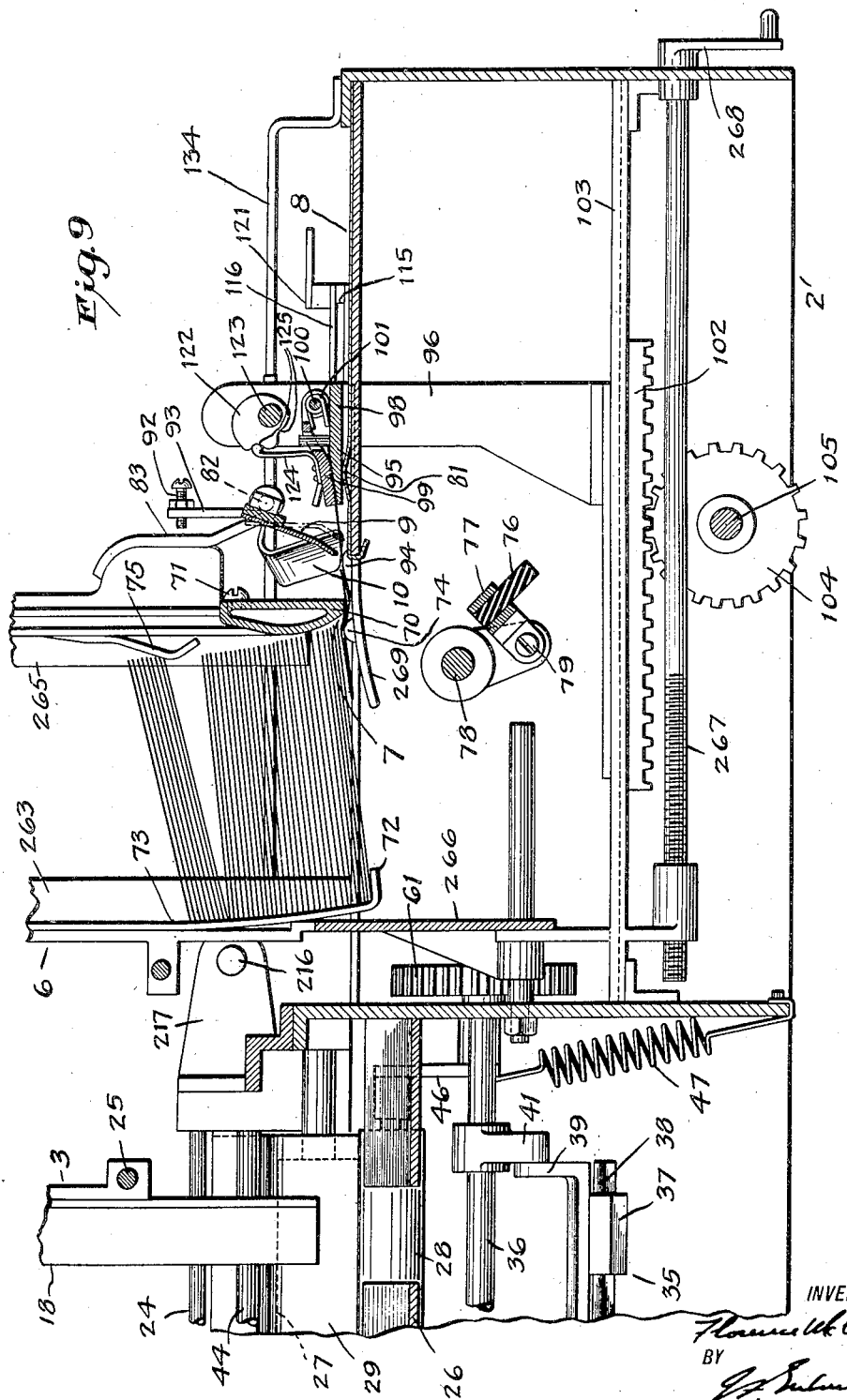

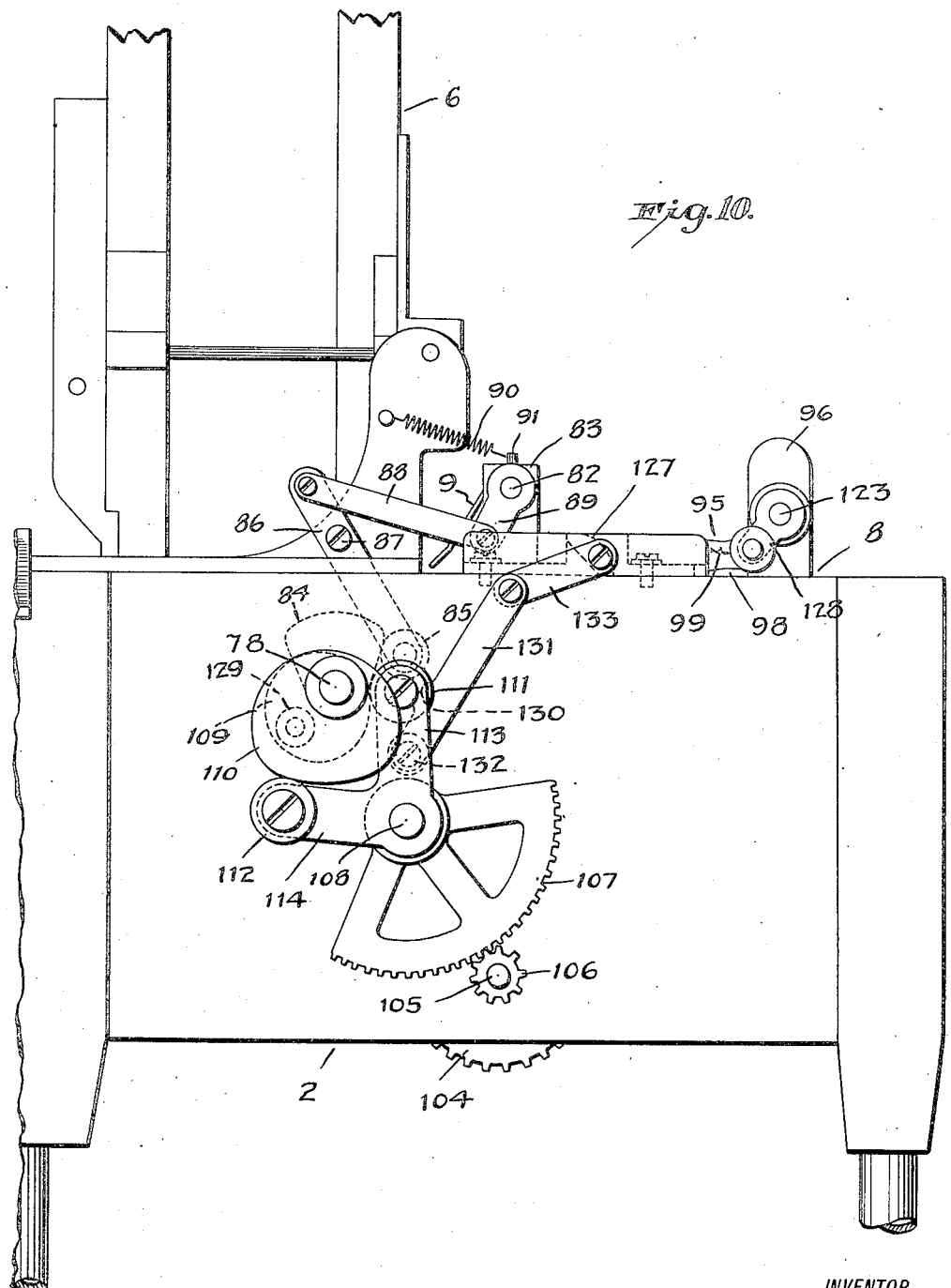

July 4, 1933.                F. McCARTHY                    1,916,847
                    GATHERING AND INSERTING MACHINE
                    Filed June 18, 1926       12 Sheets-Sheet 11
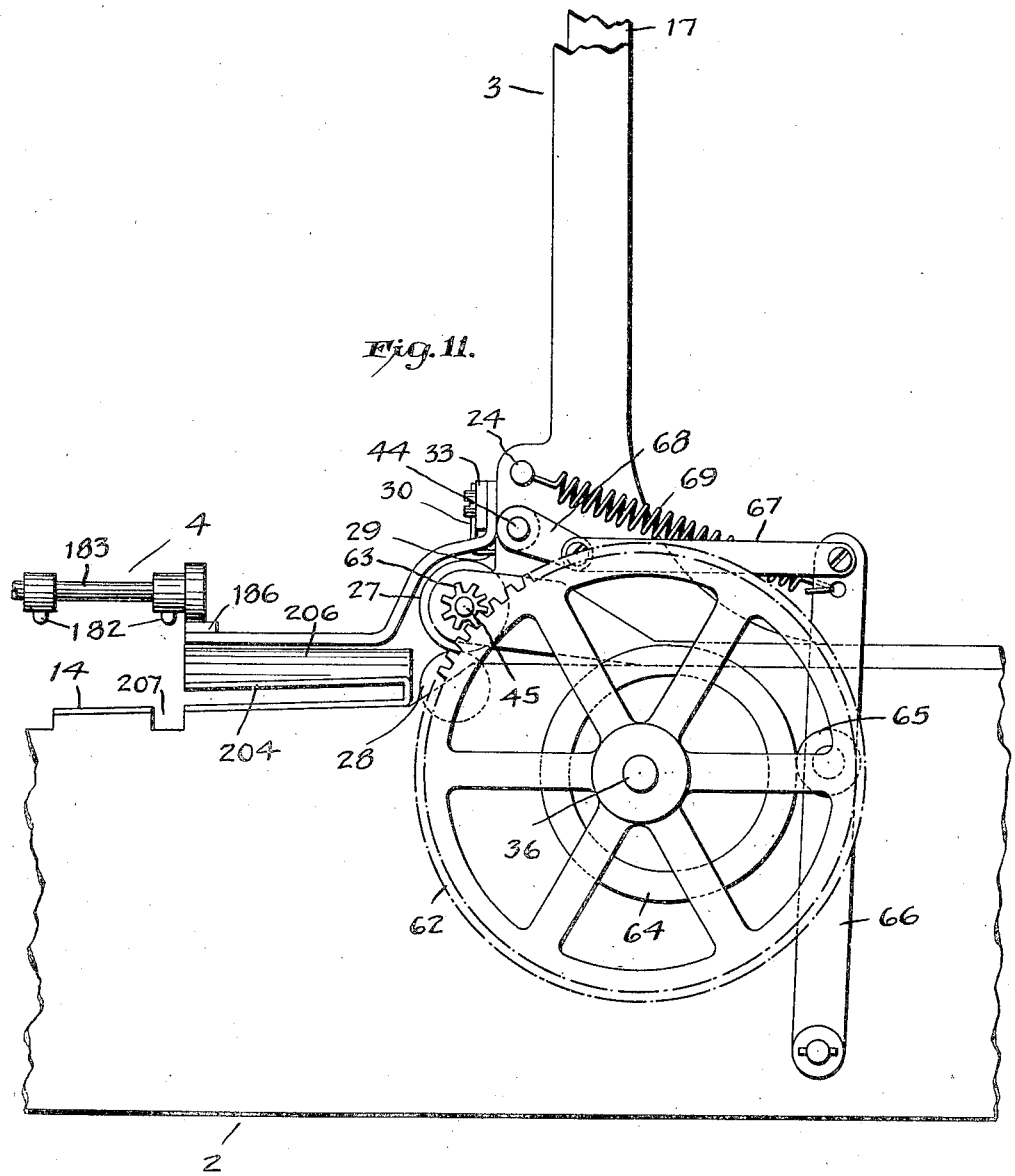
INVENTOR
ATTORNEY July 4, 1933.  F. McCARTHY  1,916,847
GATHERING AND INSERTING MACHINE
Filed June 18, 1926   12 Sheets-Sheet 12
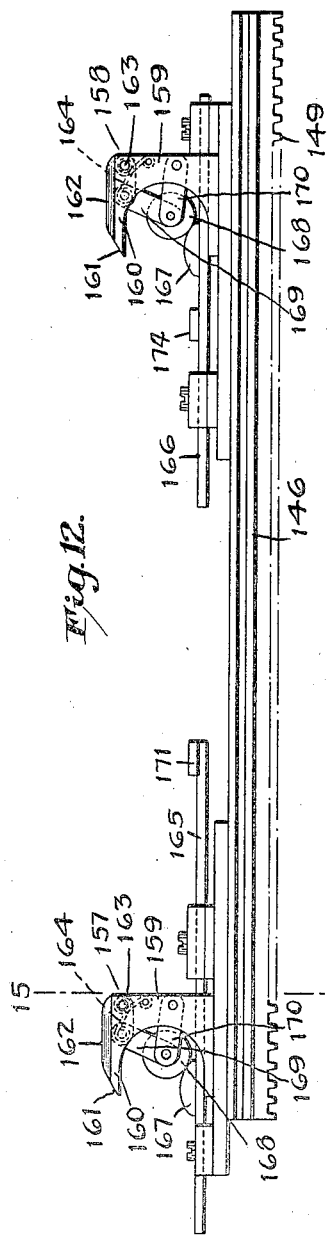
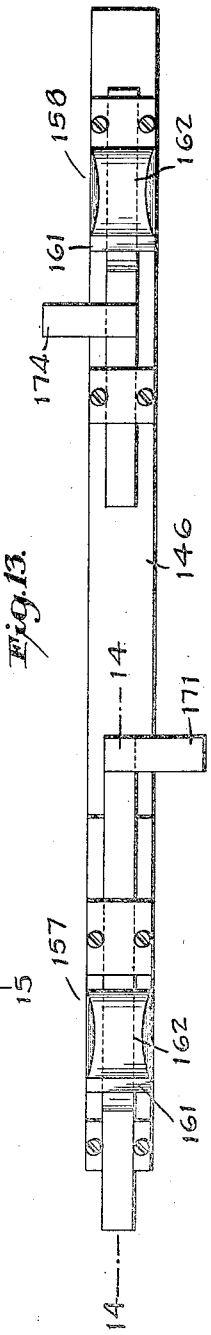
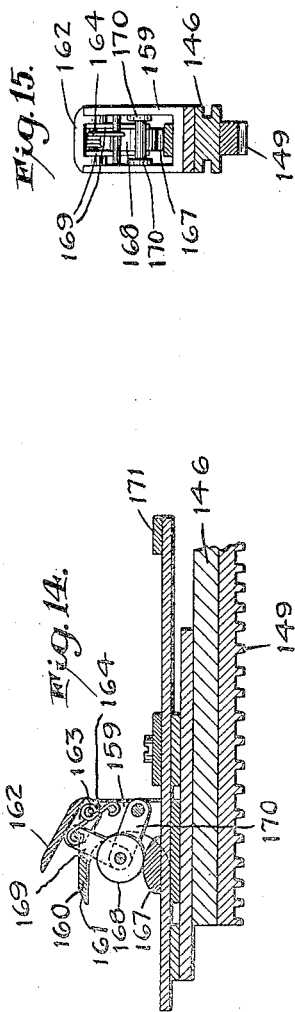
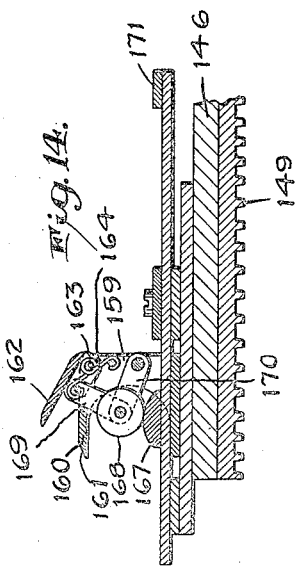
INVENTOR
BY
ATTORNEY Patented July 4, 1933

1,916,847

UNITED STATES PATENT OFFICE

FLORENCE McCARTHY, OF NEW YORK, N. Y., ASSIGNOR, BY MESNE ASSIGNMENTS, TO McCARTHY BUSINESS MACHINES CO., INC., OF NEW YORK, N. Y., A CORPORATION OF DELAWARE

GATHERING AND INSERTING MACHINE

Application filed June 18, 1926. Serial No. 116,786.

The invention comprises an automatic machine to gather enclosures from any number of supplies or magazines, and to insert the collections thus formed into envelopes. Means may also be provided for sealing the envelopes. The invention resides in the organization, and in certain parts and subcombinations, some of which may be used without others, and in various improvements in the arts to which the invention relates. The objects are to provide mechanism capable of performing this class or classes of operations effectively, reliably and rapidly, and within a small space.

The machine of this invention comprises a novel combination of part and timed mechanisms including a translational gatherer constructed and arranged to gather successive collections of enclosures delivered by feeding devices from suitable magazines, and means for presenting the envelopes successively for loading, together with positive means for inserting each collection into an envelope. More specifically, the organization is such that the enclosures are delivered simultaneously at different points, the nature of the gatherer being such as to advance the delivered enclosures along a gathering lane so that successive collections are formed as the result of repeated simultaneous deliveries of enclosures, the completed collections being carried to a loading station, where the positive means operates to load each collection into the open envelope.

In the preferred embodiment, the inserting means acts in line with the gathering mechanism, with which it may be connected, so that the successive collections are inserted into the envelopes by further movement in the direction of gathering, and the envelopes, of which there is a supply adjacent one end of the line of enclosure magazines, are preferably translated endwise, in a path at right angles to the path of gathering, to and from the loading position.

Numerous other features of the invention will be readily understood from the body of the specification and will be pointed out in the claims.

In the accompanying drawings forming part hereof:

Fig. 2 is a view which may be termed a front elevation, part of the machine at the right broken away;

Figs. 3 to 9 are vertical sections taken in the planes indicated in Fig. 1;

Fig. 10 is an elevation which may be termed a fragmentary end view of the machine;

Fig. 11 is a fragmentary elevation looking at the opposite end of the machine;

Fig. 12 is an elevation of a double gripper mechanism;

Fig. 13 is a plan view of this mechanism;

Fig. 14 is a longitudinal section taken on the line 14—14 of Fig. 13;

Fig. 15 is a cross-section taken on the line 15—15 of Fig. 12; and

Figs. 16 and 17 are schematic views illustrative of the operation of gathering and inserting.

Figure 1:
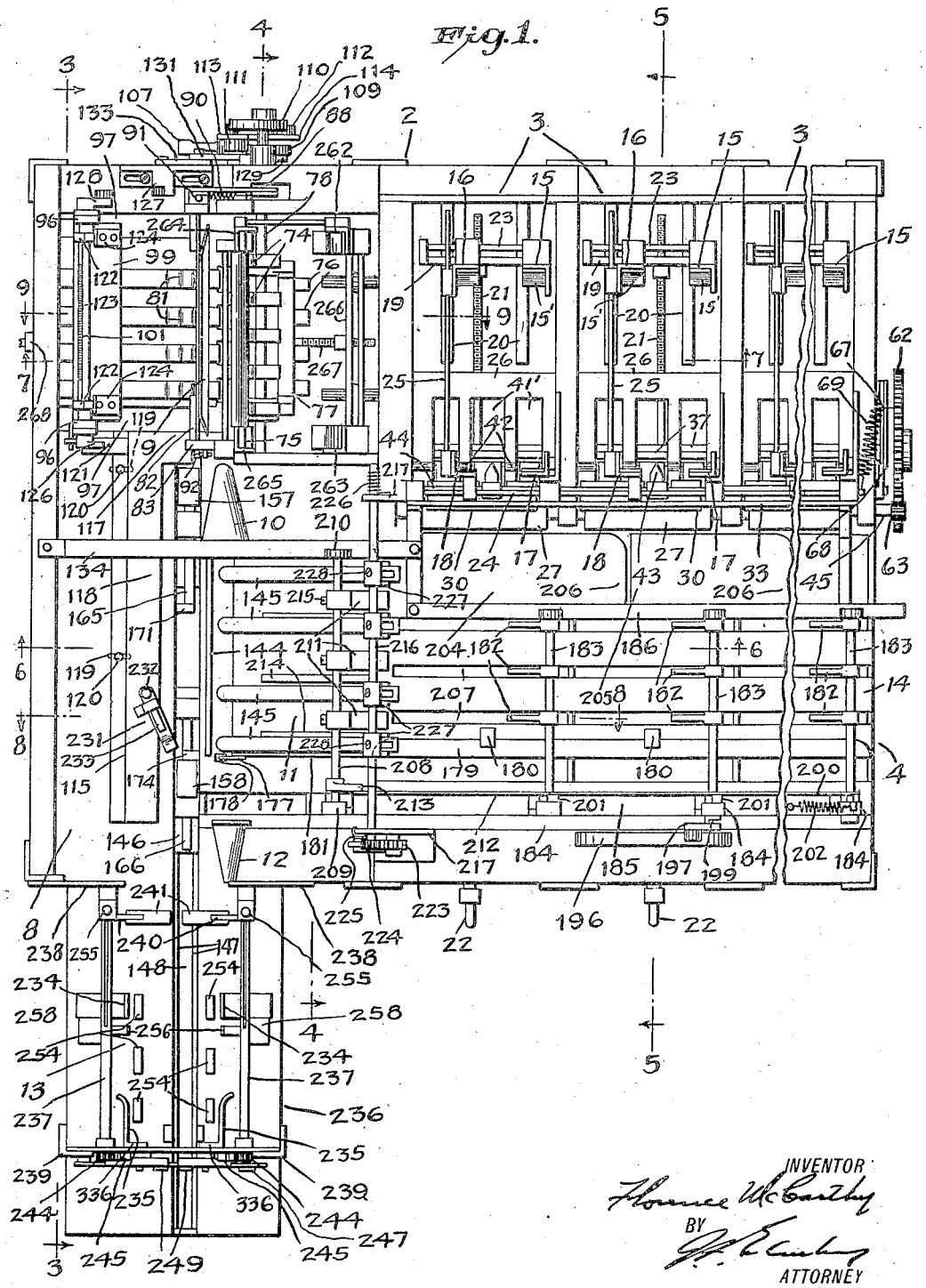
Fig. 1 is a plan view, a part of the machine of indefinite extent being broken out.

Figs. 1 to 7, 10 and 11 show parts in corresponding positions. Figs. 8 and 9 show parts at a different point in the operation. Envelopes and enclosures are indicated in certain positions in some of the views.

The machine has a table-like frame 2, the top of which presents a substantially flat deck. A row of upright enclosure magazines 3 are ranged on what may be termed the rear part of the frame; and extending across in front of them there is a gatherer or collector 4. There may be any number of enclosure magazines from two up, though the machine can, of course, be used or operated for inserting single enclosures, from a single magazine. The plan of the machine and its mode of operation are especially advantageous for inserting three or more enclosures from as many magazines into an envelope. The machine may be made sectional, so that enclosure magazines with extensions of the gatherer can be added.

The enclosure magazines face the gatherer, having throats 5 in front, at the bottom, from which the enclosures are delivered one at a time to the gatherer.

The envelope magazine 6 is best disposed at one end of the row of enclosure magazines, facing outwardly at right angles to the direction in which the enclosure magazines face. The throat of this magazine, marked 7, faces onto the deck 8.

The magazines are more particularly of a kind to hold the sheet articles in stacks, and to feed from the bottoms of the stacks; but I do not necessarily limit myself to the specific form of the elements of the machine.

The enclosures consist more usually of sheets folded into oblong form, and the enclosure magazines are of generally oblong area and are adapted to deliver such enclosures endwise. The enclosures, that is to say, the contents of one or more of the magazines, may also be in the nature of blotters, cards or slips. Any or all of these kinds of enclosures will be delivered and collected and inserted into envelopes by the machine. The enclosures are fed endwise in parallel directions to the gatherer and by the gatherer are translated in a direction transverse to their length. By a further movement in the same direction as that in which they were gathered the collections are positively inserted into the envelopes.

The envelopes are held in the envelope magazine with their flaps up and are preferably drawn out in a direction transverse to their flaps and with their bottom edges in advance, beneath a flap opener or raiser 9 located directly in front of the magazine, by which the flaps of the envelopes are opened or partially opened. This flap raiser will be described more particularly later on. The successive envelopes are then translated endwise, in a direction at right angles to that in which they are withdrawn from the magazine, and in a direction at right angles, also, to the direction in which the enclosures are translated by the gatherer 4 to form the successive collections which are inserted into the envelopes. Each envelope is thus brought to a loading station opposite the end of the gatherer, and its flap having been turned further or completely open on the way by a guide 10, and being held open and out of the way, it pauses to receive its load of enclosures, which are pushed into it off a loading platform 11. The gummed side of the flap of the envelope may be moistened while the envelope is at the loading station, and when the envelope has been filled, it is moved endwise away from the loading station in the same direction as before. It may pass a guide 12 which turns its flap back to or toward closed position, and thence may pass to a stacker 13, where it is introduced at or beneath the bottom of the stack, there to be lifted or pressed up against the bottom of the stack for sealing.

The various operations are performed in timed relation by parts and mechanisms which will be described in detail, the whole being interconnected and driven by proper gearing and motions from a common source of power. The machine, as preferably embodied, provides for visibility and accessibility. The enclosures are delivered to and gathered upon an upwardly facing support, which is most advantageously a stationary table 14. The envelopes likewise lie flat or horizontal throughout their course from the envelope magazine, to the loading and flap-moistening position, and thence to the stacker.

The organization in which the envelope is caused to move in a right angular course, being delivered from the stack in a direction transverse to its flap and bottom edge, and then moved endwise to the loading station, is advantageous and is preferred since it contributes to making the machine very economical of floor space, and also because the flap is opened in the most effective manner. However, I do not exclude arrangements in which the envelopes might be moved in other courses. Thus, they might be moved to the loading station in a single direction, which would permit of some simplification in mechanism, though such an arrangement would scarcely be as satisfactory on the whole.

Each enclosure magazine has four upright, or substantially upright corner angles 15, 16, 17 and 18, which are relatively adjustable to vary both the width and the length of the stack area which they define. The two rear uprights 15 and 16 are carried by a back piece 19, which is guided on rods 20 projecting forward from the frame 2 and is shiftable by a rotatable screw rod 21 which passes to the front of the machine. Handles 22 outside the front of the machine, below the gatherer, are affixed to the forward ends of these screw rods and enable the enclosure magazines to be adjusted for different lengths of enclosure, in a convenient manner.

One rear corner member, 15, of each enclosure magazine is fixed on the back-piece, or movable support, 19, while the other rear member 16 is movable laterally toward and from the member 15 on transverse guide rods 23 carried by the back-piece. In like manner, the forward corner member 18 which is directly in front of the rear corner member 16, is laterally adjustable on a guide rod 24 on the fixed framework. A rod 25 connecting the members 16 and 18 and having sliding engagement with the latter member alines these members and keeps the forward member 18 from tilting on its guiding and supporting rod 24.

The rear members 15 and 16 of each enclosure magazine carry back guides 15' for the rear edges of the articles in the stack. These guides might be provided by simply making the backs of the members 15 and 16 of the shape of the guides, but for convenience of manufacture it is more convenient to use angle pieces and to secure properly bent strap pieces in them to form the back guides. These guides extend obliquely downward, inclining forward at an acute angle to the vertical so as to cause the sheet articles to work forward in the magazine as the stack settles downward to the bottom. This insures that the forward edge of the bottom article will always be close to the throat 5, and is also of advantage in connection with an upward and forward inclination in the floor or bottom support 26 of the magazine, which causes the articles in the stack to tilt somewhat downward and rearward, so as to keep the forward end of the bottom article more or less free of the superincumbent weight.

The floor 26 is suitably attached to the fixed frame of the machine, and at its forward end is extended for a short distance outwardly from the base of the magazine and slightly bent to form a substantially horizontal guide lip adjacent the bite of upper and lower feed rollers 27, 28.

It is not necessary that the floor extend all the way to the back of the enclosure magazine. Rear support is provided for the bottom of the stack, such support being conveniently arranged by bending the lower ends of the back guides 15' forwardly.

The throat 5 is defined by the floor 26 and a vertically adjustable stripper 29. There is an independently adjustable stripper for each of the enclosure magazines, consisting most advantageously of a plate extending across the lower front of the magazine and bent to provide an upper, forwardly presented portion 30 having vertical adjustment slots 31 therein, and a lower or stripper part which bears the reference number 29 in the drawings. This part is bent or curved, so that its inner side inclines downwardly and forwardly at an acute angle to the vertical, its terminal lip 32 being curved more abruptly forward.

Each of these strippers is adjustably supported on a cross-bar 33, or other suitable fixed support, by means of accessible screws 34, which pass through the slots 31 into the bar. The throat can thus be readily set for any thickness of sheet article which is to be fed from the particular magazine. This is done by loosening the screws 34 so that the stripper is free to settle by its own weight, placing one of the articles in the throat so that the stripper rests on it, and then tightening the screws to preserve this spacing.

The bottom article is advanced through the throat of each enclosure magazine by a feeding device 35 disposed beneath the forward part of the magazine. In the preferred embodiment, the feeding devices of the several magazines are mounted on a rotary shaft 36 which is suitably journaled in the fixed frame, extending transversely beneath all the magazines. This shaft may naturally be made of connected sections, appropriate to the sectional construction of this part of the machine.

Each of these feeding devices comprises a line of freely projecting, rather thin, flexible resilient rubber fingers 37. The nature of the feeding element is in itself important, though the feeding means as a whole and in its other aspects is not necessarily limited thereto.

The fingers 37 are mounted in a bar 38 carried by short arms 39, which are pivoted at 40 to other short arms 41 carried by the shaft 36. Thus, the fingers are hinged to the rotary carrier at a point offset with respect to the fingers and eccentric to the main axis of rotation, this or other equivalent manner of mounting being such that, as the feeding element is carried upward and forward to feed, the finger bar is supported by the carrier to push the article to be fed, as shown in dotted lines in Fig. 5, but when the article, having been thus advanced, is seized and rapidly drawn forward as will be presently described, the frictional feeding element is free to be snatched forward by the pull of the accelerated article, and to drop, so as not to create trouble and cause waste of power by resisting the withdrawal. Substantially the same action may be obtained by specifically different though generally similar means.

The floors 26 are slotted at 41' to permit the fingers 37 to work through them against the under side of the bottom article to be delivered. The forwardly moving fingers flex rearward in contact with the article under the weight of the stack, pressing resiliently against the article, and securing a frictional hold which is very effective for feeding the article through the throat.

At a short distance behind the throat the floor 26 is provided with a transverse row or ridge of rounded or inclined humps 42. This elevation deflects or inclines the forward end of the bottom article upward so that it will strike the downwardly and forwardly inclined back of the stripper 29 just above the throat, compelling the leading edge of the article to dive a little to pass through the throat. The article next above is caused to abut the stripper somewhat higher up, and the result is to insure that this next to bottom article will be held back in the magazine and that two articles will not be fed out at the same time.

Directly after the forward end of the article being fed emerges from the magazine it enters the bite of the rollers 27, 28. These rollers are driven at a comparatively high speed ratio by arrangements which will be described, so that they drive the article forward at considerably higher speed than it was started out of the magazine by the device 35. In so doing, they throw the frictional feed element or elements 37 forward and downward through the pull of the article, these elements being free to move in this manner relatively to their driven carrier, as described.

The enclosure magazines, as has been stated, are so designed, that the forward portions of the bottom articles are fairly free of the weight of the stack. For still greater effectiveness a moving device 43 is provided for positively lifting and supporting the weight in the forward part of the bulk of the stack, this device being preferably located at a short distance above the bottom of the magazine so that a shallow depth of articles lies beneath it. The device comprises a finger fixed to a rock-shaft 44 extending across the fronts of the magazines, the fingers of the several magazines being rockable from positions in which they project rearward into the fronts of the stacks, as seen in full lines in Fig. 5, to positions in which they extend downward clear of the stack, so as to permit the forward parts of the articles, which it lifted on the upstroke, to descend. The intermediate part of the stripper 29 is appropriately cut out to permit the movement of this device.

The lifter 43 is operated in timed relation to the feeder 35 so as to lift the forward part of the bulk of the stack at the time when the feeder 35 operates to advance the bottom article through the throat, and to move out of the way so as to let the stack settle after the article thus advanced has been seized and forwarded by the rollers 27, 28.

The upper rollers 27 of the several magazines are on a rotary, driven shaft 45, which like the other shafts in this part of the machine may be understood to be sectional. The lower rollers are idle and are yieldingly carried by pivoted arms 46 acted upon by springs 47.

The means for driving the parts which have been described in the proper time and ratio will now be described. A driving motor 48 is shown in Fig. 6. A belt 49 passes from a pulley 50 on the shaft of the motor to a pulley 51 on a shaft 52 (Fig. 5). A pinion 53 on this shaft meshes a gear 54 on a shaft 55, which shaft bears a pinion 56 meshing a gear 57 on a shaft 58. The gear 57 meshes another gear 59 on a shaft 60, and the gear 59 meshes a gear 61 on the shaft 36 of the rotary feeding devices 35 beneath the magazines.

The shaft 36 bears a large gear-wheel 62, which meshes a small pinion 63 on the shaft 45 carrying the feed rollers 27. A cam or eccentric 64 on the shaft 36 acts upon a roller 65 carried by a swinging arm 66, which is connected by a link 67 with a crank 68 on the end of the rock-shaft 44 of the lifters 43. A spring 69 connected to the arm 66 holds the roller 65 against the cam and moves the lifter in the lowering or retreating direction.

The envelope magazine has four upright corner angles 262, 263, 264, 265, the rear corner members being carried by a piece 266 which is adjustable fore and aft by a screw rod 267 having a handle 268 at the front or outer side of this part of the machine frame. The members 262 and 264 are adjustable laterally toward and from the members 263 and 265 in a manner which has been described in connection with the enclosure magazines.

The throat 7 of this magazine is defined between a floor 269 and a stripper 70, the back of the stripper inclining or curving downwardly and forwardly to the top of the throat. The stripper may be adjusted up or down similarly to the strippers of the enclosure magazines, first loosening and afterwards tightening screws 71.

The floor 269 slopes downward and rearward from the throat, as in the case of the enclosure magazines, the rear stack supports 72 being also properly placed, so that the envelopes lie at an inclination, tilted somewhat upwardly and forwardly. Rear guides 73 extend downward at the back of the magazine, inclining forward somewhat from the vertical, for a purpose similar to that described in connection with the enclosure magazines.

The floor has a ridge or line of rounded or sloping elevations 74 behind the mouth 7, so as to deflect the envelope or envelopes at the bottom of the stack upward to strike the inclined back of the stripper 70, causing the end of the bottom envelope to "duck under" in order to pass out, while the next envelope is reliably held back.

A support is provided to keep the weight in the bulk of the forward part of the stack off the moderate depth of envelopes in the lower part of the magazine, from which feeding takes place. This support could be a mechanically operated lifter such, for example, as the lifter 43 of the enclosure magazines, but a stationary support has been found sufficient. Such a support, which also permits descent past it of envelopes in the upper part of the stack as the result of envelopes being withdrawn at the bottom, may consist of downwardly and rearwardly inclined pieces 75 fixed in the front corner members 264, 265 of the magazine. This device serves to support the forward part of the main part of the stack clear of the forward part of the envelopes beneath. The rear edge, that is to say, the flap edge, of the envelope next above this separation, rests upon the envelopes in the bottom of the magazine, so that, as the lower part of the stack settles, the rear edge of the envelope which is caught up at its forward edge settles also, enabling its forward edge to escape the support or catch 75 and drop.

The floor 269 is slotted to permit the passage of rubber feeding fingers 76 similar to the flexible feeding fingers 37 of the enclosure magazines. Because of the stiffer nature of the envelopes the fingers 76 may be somewhat shorter or stubbier than the fingers 37. The fingers 76 are mounted in a bar 77, which may be connected to a rotary shaft 78 by a construction similar to that described in connection with the enclosure magazines. However, there is not the same importance in enabling the frictional feeding element for the envelopes to escape forward, or forward and downward, relatively to its carrier, when the advancing envelope is seized and carried out of the magazine. Consequently, the screw 79 seen in Fig. 9 may represent either a pivotal joint, like the pivot 40 hereinbefore described, or a fixed connection.

The rotary feeder shaft 78 is driven from the shaft 60 previously referred to, through bevel gears 80. The shaft 78 also has other instrumentalities connected with it, as will appear.

Directly in front of and over the mouth of the envelope magazine is a flap-opener or raiser 9, preferably consisting of a horizontally extending blade carried by a rock-shaft 82 parallel with the front of the magazine, the rock-shaft being mounted in brackets 83. The flap-opener is relatively stationary, that is to say it opens or raises the flap by virtue of the movement of the envelope relatively to the flap-opener, but it has a slight up and down movement so as not to obstruct the passage of the forward (bottom) edge of the envelope beneath it, and thereupon to press or move close to the back of the moving envelope so as to be sure to pick up the flap.

This flap-opener is operated by a cam 84 on the shaft 78 (Figs. 4 and 10), which acts upon the roller 85 of a lever 86 fulcrumed at 87 on the frame, this lever being connected by a link 88 with a crank 89 on the shaft 82. The cam operates to raise the flap-opener sufficiently at the proper time, so that the body of the envelope may not be blocked by it, and to permit it to descend in time to catch the flap. The actual movement of the flap-opener against the back of the envelope is preferably effected by yielding means, by weight or by a light spring 90 connected to a projection 91 on the shaft 82; and the extent of downward movement and the degree of pressure on the envelope back by the flap-opener may be regulated by means of a stop screw 92 threaded through an arm 93 carried by the flap-opener, the screw being opposite one of the brackets 83, with which it will contact when the flap-opener has descended as far as it will be permitted.

The floor 269 of the envelope magazine is preferably continuous with the platform or deck 8 heretofore referred to as lying in front of the envelope magazine. On this floor or platform, or rising slightly from the plane thereof, directly in front of the mouth 7, is an inclined elevation, or row of elevations, 94, presenting a shoulder or ridge just behind the lower edge of the flap-opener 9. The relations between these parts are such that, as the flap-opener descends, it bears upon the back of the envelope in front of the shoulder on which the envelope is resting at this point, thereby "breaking" the envelope so as to cause a separation between the tip of the flap and the back of the envelope, into which the flap-opener may certainly enter.

A means is provided for gripping and positively withdrawing the envelope started out from the magazine, and for releasing it at a definite point. In the illustrated embodiment this means comprises a gripper 95 mounted on a reciprocatory carriage 96 which is mechanically operated to move toward and away from the mouth of the magazine.

The said carriage is shown as consisting of two uprights bearing the numeral 96, these uprights passing through slots 97 in the deck of the machine at opposite sides of the portion of the surface 8 which is directly in front of the envelope magazine (see Fig. 3), and a connecting cross-piece 98 which extends across over said surface. The cross-piece is set at such height on the uprights of the carriage that a narrow space exists between the cross-piece and the underlying surface. The forward part of the cross-piece constitutes the lower, fixed jaw of the gripper, its upper surface preferably being inclined somewhat downward and forward, as seen in Fig. 9. The upper jaw 99 is pivoted on the carriage at 100, and a spring 101 urges this jaw to raise or open it. One or both of the gripping faces of the jaws are serrated or roughened for gripping.

The carriage uprights 96 have rack bars 102 on their lower ends, which are slidable in parallel guides 103 and are meshed by a pair of gears 104 on a rock-shaft 105. This shaft bears a pinion 106 on its outer end (Fig. 10), which is meshed by a segment gear 107 on an axle 108. This segment gear is oscillated in a predetermined manner by a double cam 109, 110 (Figs. 3 and 10), the members of which act upon rollers 111, 112 carried by arms 113, 114 fixed to the segment, so that the segment and thereby the carriage are positively actuated in both directions. The cam is so designed that the gripper carriage rests stationary for a period at the end of its stroke away from the magazine, when it has drawn out and released an envelope, and before it starts forward to take the next envelope; and the period of rest thus provided is sufficient to allow long as well as short envelopes to pass out of the path of the gripper in the endwise direction before the gripper returns.

This gripper is controlled so as to close upon the advanced bottom portion of an envelope sticking out of the envelope magazine substantially at the moment when the gripper has completed its stroke toward the magazine, or slightly after it has reversed its motion and started away from the magazine, and to release the fully withdrawn envelope at a definite, adjustable point before the gripper reaches the end of its stroke away from the magazine. The point where the envelope is to be released is the back wall 115 of an overhanging guide 116, which is secured to the deck of the machine and extends at right angles to the direction of movement of the gripper 95 and to the direction in which the gatherer 4 moves the enclosures toward the loading station. The rear end of the back wall of this guide is opposite a portion of the throat 7 of the envelope magazine so as to constitute a stop to which the bottom edge of each envelope is carried by the gripper. An apron 117 (Figs. 1 and 6) extended from this end of the overhanging wall 118 of the guide into proximity to the envelope magazine, and upwardly inclined at its end, keeps the forward corner of the envelope from curling up and possibily striking or riding over the edge of said wall.

The guide 116 is adjustable in its position in a direction transverse to itself, in order that it may be set for envelopes of different widths, and it is therefore important to be able to determine correspondingly the point at which the gripper 95 releases the envelope. The adjustability of the guide 116 may be provided for by forming slots 119 in the deck of the machine, to receive bolts or screws 120 passing downward through the back of the guide, the screw devices being adapted to be loosened to permit the guide to be shifted and then tightened to make the adjustment secure. The opening of the gripper 95 to release the envelope carried up to the guide is controlled or effected by a trip piece or contact portion 121 (Figs. 1 and 9), which is formed on, or operatively connected with, the rear end of the guide 116, so as to partake of any adjustment of said guide, or, at least, to have its adjustment determined by the adjustment of the guide.

The upper jaw 99 of the gripper is movable to and lockable in the closed condition by a pair of cams 122 fixed to a rock-shaft 123 mounted in upper extensions of the carriage side members 96. These cams coact with stiff spring fingers 124 fixed to said upper jaw and having noses to bear upon the peripheries of the cams and to be held non-positively in locking notches 125 therein. In this condition, which is shown in Fig. 9, the spring fingers 124 are tensioned, so that the gripper is held gripped on the envelope under fairly powerful spring pressure. When the carriage 96 is moved to the right from the position of Fig. 9, to that of Fig. 10, an arm 126 (Fig. 1) on one end of the rock-shaft 123 strikes the stationary contact 121, thereby quickly turning the cams 122 clockwise from the position of Fig. 9, so as to release the fingers 124 from the locking notches, permitting the gripper to open under the action of its spring 101. This occurs before the gripper reaches the end of its back stroke, that is to say the stroke away from the envelope magazine.

To close the gripper quickly upon the next envelope when the gripper carriage is in its forward position, nearest the magazine, a striker 127 is mounted slidably on the frame of the machine to coact with an arm 128 on the opposite end of the rock-shaft 123 (Fig. 10). This striker is actuated at the proper time by a projection or roller 129 on one side of the cam member 109. This projection, once in each revolution of the shaft 78, strikes a portion 130 of a lever 131 which is fulcrumed on the fixed frame at 132 and is connected by a link 133 with the striker 127. This action occurs when the gripper has completed its forward stroke, and results in turning the cams 122 so as to close the gripper and lock it.

In order to insure that the forward edge of the envelope as it is advanced from the magazine shall enter between the jaws of the gripper, a yielding double-incline 81 is arranged in front of the throat of the envelope magazine in such position that the gripper, as it approaches the end of its forward stroke, rides onto the incline and depresses it. The forward slope of the incline deflects the envelope upward so that it may not strike the edge of the lower jaw or pass beneath it; and the depressing of the incline by the gripper as the latter approaches its forward limit of movement lowers the envelope so that it may not pass over the upper jaw. This incline may be formed as shown, in a number of thin, flat springy strips laid upon the deck over which the gripper travels back and forth.

The envelopes are drawn forward from the magazine only far enough to bring the flap into engagement with the flap-opener or raiser 9, and the latter is placed close in front of the mouth of the magazine, so that the size of the machine is kept as small as possible. For this reason the flap need not be dragged under the flap-opener so as to turn it all the way back by this instrumentality, but is simply turned up and rests against the back of the element in a partly opened condition.

It will be noted that this flap-opener is extended as a blade in the direction of the length of the flap so that it will enter beneath the whole length, or at least the greater part of the length, of the flap of the longest envelope that may be used. In other words, this flap-opener is designed to be substantially coextensive with the length of the flap. This is important because a flap may be stuck to the back of the envelope at one point or another, and the horizontally extending flap-opener will break the adhesion wherever it may occur.

When the envelope is carried endwise away from this position by the means that will be described, the flap moves lengthwise in contact with the diagonally disposed flap opening guide 10, which turns the flap back past the vertical to or toward a horizontal, fully opened position. This guide is fixed on a bridge bar 134 forming part of the fixed framework.

In this movement the envelope is carried to a position opposite the loading platform 11, and there allowed to rest for a moment, the flap of the envelope passing beneath the platform, which is arranged to allow of this, and the flap being thereby held out of the way. Preferably, the loading platform is raised somewhat to facilitate the passage of the flap beneath it, and is then lowered or pressed down for the purposes of bringing the platform down to the plane of the envelope for the loading operation, of holding the flap out of the way during loading, and of more effectually moistening the gum of the flap by the means to be described. In some instances, the raising and lowering of the platform might be omitted.

The moistener is located beneath the loading platform, that is to say, at the loading station, so that the loading of the envelope and the moistening of its flap are accomplished virtually in the same operation, or at the same part of the machine.

In the preferred and simple embodiment the moistener comprises an absorbent pad or sheet 135 applied to the under side of the platform, and having its rear portion 136 depending as a wick into a stationarily supported reservoir 137. Yielding spring fingers 138 project from the portion 139 of the fixed deck of the machine adjacent the platform, to support the gummed face of the flap against the wet pad.

The platform is raised in advance of the passage of the flap beneath it and is lowered when the envelope comes to rest in front of the loading platform, by a cam 140 on the shaft 78, said cam acting upon a roller 141 carried by the platform. The platform is hinged or fulcrumed at the rear, that is to say at its portion adjacent the end of the gatherer 1, as indicated at 142, in such manner that it can be readily lifted out when the moistener requires attention. It is drawn down by a spring 143.

The portion 139 of the deck in front of the loading platform bears a longitudinal rib or shoulder 144, the function of which is to underlie the front wall of the envelope, parallel with the fold of the flap, so that the said wall is bent over this shoulder by guide fingers 145 in entering the envelope, whereby the mouth of the envelope is opened sufficiently to insure that the said fingers will enter and will not ride over the back of the envelope. These fingers will be described more particularly later on.

The empty envelopes are moved to the loading station, and released, and the filled envelopes are moved from this station, and released, by a positive gripper mechanism of advantageous character which will now be described.

A long slide bar 146 (Figs. 3, 6, 8, and 12–15) is mounted in fixed guides 147 beneath a slot 148 in the deck of the machine extending parallel with the guide 116. This slide has a rack 149 on its under side which is engaged by a large segment gear 150 on a rock-shaft 151 journaled in the frame. A pinion 152 fixed on the axis of the segment gear 150 is meshed by the segmental rack end 153 of a lever 154, which is fulcrumed at 155 and is rocked by an eccentric 156 on the shaft 58.

The slide carriage 146 carries two grippers 157, 158 spaced apart lengthwise of the slide by a distance somewhat greater than the distance through which the envelopes are translated from the position in front of the envelope magazine to the position at the loading station. These grippers are mounted on brackets 159 rising from the slide, and each has a fixed horizontal lower jaw 160, the upper face of which is approximately even with the plane of the deck whereon the envelope is supported. The lip 161 of each of these jaws is beveled so as to ride under the envelope.

The upper jaw 162 of each of said grippers is pivoted at 163, so that the jaw can be raised to open the gripper and lowered to close it. Springs 164 act upon these jaws to close them.

Two slides 165, 166 are mounted on the slide carriage 146, in such manner as to be movable lengthwise of the carriage; and each of these slides carries a cam or projection 167 adapted to pass beneath, and from one side to the other of, a roller 168 carried by a link or thrust member 169 pivoted to the under part of the movable jaw 162, said link being confined or guided by another link 170 pivoted to the first link and to the bracket 159. When the cam or bump is introduced beneath the roller of the movable jaw, it raises the jaw as seen in Fig. 14, while when the bump is moved to one side or the other of the roller, the jaw is permitted to close.

The slide 165 has a tappet arm 171 projecting laterally therefrom, to encounter alternately two stops 172, 173 set at definite positions on the fixed frame. The position of the stop 172 is such that it is encountered by the arm 171 just as the gripper approaches the end of its stroke nearest the envelope magazine. This stops the motion of the slide 165, while the carriage 146 proceeds somewhat farther, with the result that the cam 167 passes beneath the roller 168 and opens the gripper in time for its jaws to pass above and below the forward end of the waiting empty envelope. At the end of the stroke, the cam passes out from under the roller, or actually, the roller passes off the cam, so that the gripper closes tight upon the envelope. Now, when the carriage 146 moves in the reverse direction, it drags the envelope along the deck to the loading station. Somewhat before the end of this stroke, the arm 171 strikes the stop 173, which again holds the slide 165 stationary relatively to the still moving carriage. The cam is consequently brought under the roller, opening the gripper and releasing the envelope; and then as the cam passes to the other side of the roller, the gripper closes so that on the stroke in the opposite direction it may pass under the envelope left at the loading station. The lip of the upper jaw is beveled in the same manner as the lip of the under jaw in order that the gripper in the closed condition may slide under the envelope and not strike it.

The slide 166 has a tappet arm 174 to coact in a like manner with spaced stops 175 and 176. When the carriage 146 approaches the end of its movement in one direction the arm 174 strikes the stop 175, which shifts the cam 167 of the gripper 158 relatively to the roller so as to momentarily open and then close the gripper, causing it to seize the end of the envelope at the loading station, this envelope being now loaded. The carriage 146 then moves in the opposite direction, dragging the loaded envelope away from the loading station to the stacker 13; and toward the end of this movement the arm 174 strikes the stop 176, again momentarily opening the gripper to release the envelope, then closing the gripper so that it may pass back under the envelope.

A gauge or abutment 177 (Figs. 1 and 3) movable into and out of the path of the envelopes at the loading station, is provided to prevent overthrow of the empty envelope by momentum when it is released by the gripper. This gauge is positioned to stop the envelope of whatever size in proper relation to the gatherer and loader, which will be described presently; and it must be mounted and operated so as to be interposed at the proper moment to perform its function, and to be moved out of the way in time to permit the loaded envelope to be drawn onward to the receiving stack. This may be accomplished in specifically different ways; but the use of a mechanically operated movable loading platform and sealer 11, such as described, makes it possible to place such a stop on this platform, to be moved up and down by and with such platform. The gauge is accordingly formed or fixed on the forward corner of said platform which is more remote from the envelope magazine, the gauge projecting forwardly and downwardly so as to project into the path of the envelope and to enter an opening 178 in the deck when the platform is lowered.

The gatherer will now be described. The gathering table extends across the fronts of the enclosure magazines to the loading platform, which constitutes the terminal portion of this table. The enclosures are shot across the table by the rollers 27, 28 revolving at high speed, up to a longitudinally extending gauge guide 179. Rebound from this guide is prevented by springs 180 associated with the gauge and resting with light pressure on the table so that the sheet matter passes readily beneath them and is held frictionally against the rebound. The table faces upwardly, as previously stated, but is preferably sloped transversely downward away from the enclosure magazines toward the gauge guide 179, in order to aid the delivery of the enclosures to the gauge. The slope may be considerably greater than shown in Figs. 5 and 11.

A number of enclosures are thus delivered simultaneously upon different parts of the gatherer, all alined against the gauge guide. The gatherer includes means for translating these enclosures lengthwise of the gatherer, toward the loading station, so that as successive enclosures are delivered from the magazines upon the enclosures already on the gatherer, successive collections are made and delivered to the loading platform 11.

It should be stated that this platform has a guide 181 in line with the guide 179. The envelope gauge stop 177 heretofore referred to is substantially in line with this guide, though somewhat offset from it, since the end of the envelope should naturally be somewhat beyond the guide.

The mechanism for translating the enclosures on the gatherer is of a reciprocatory character. It comprises transverse sets of fingers 182, which are moved back and forth lengthwise of the gatherer, there being as many of these sets of fingers or pushers as there are enclosure magazines, and the stroke being such as to carry enclosures from a position in front of one magazine to a position in front of the next magazine.

The pusher fingers are shown attached to transverse rock-shafts 183, which extend over the gatherer table, though this may be varied. The rock-shafts are shown turnably mounted at one end in brackets 184 on a slide 185 guided in the fixed frame for movement parallel with the length of the gatherer, and at their opposite ends they are supported by a track 186, the shafts having rollers at these ends to roll on the track.

The slide is reciprocated in proper time by mechanism seen in Fig 4. A double cam 187 on the shaft 58 rocks one end of a lever 188, having at its opposite end a rack segment 189 which meshes a pinion 190. This pinion is united with a bevel gear segment 191 which meshes a pinion 192 on a rotary shaft 193 which carries a pinion 194, this last pinion meshing a rack 195 on the slide 185.

The pushers 182 must be moved out of the way of the enclosures on the back strokes, and be repositioned for pushing before or at the commencement of the next forward stroke. This is accomplished by means of a stationary track or cam 196 on the fixed frame, cooperating with a reversing arm 197 carried by the reciprocating part of the gatherer. The arm passes off this track at each end of the stroke and as the motion of the carrier is reversed the arm is dragged trailingly over the track again so that its angular position is changed at each reversal of movement. This arm is pivotally hung on the end of one of the rock-shafts 183 and has an abutment at 198 (Fig. 2) which bears against a pin projection 199 on said shaft when the carriage starts on the back stroke. This lifts or moves the pushers out of the way, so that they clear the enclosures. The several rock-shafts are connected by a bar 200, which is pivoted to arms 201 on the shafts, with the result that all the pushers rise and fall in unison. A spring 202 (Fig. 1) connected to an arm of one of the rock-shafts acts to move all the pushers into pushing position when the arm 197 rides off the rear end of the track 196.

The members of the double cam 187 are so formed that the reciprocatory gatherer mechanism is driven at moderate speed on the forward, pushing strokes, and at high speed on the return or idle strokes.

The springs 181 previously mentioned as preventing rebound of the enclosures when they are delivered onto the gatherer by the high-speed rolls 27, 28, also act to check overthrow of the sheet matter at the end of each step in the movement of the enclosures by the gatherer toward the loading station. Other springs 203 bear lightly upon the table across from the springs 181 for the same purpose.

The side of the gathering surface or table near the enclosure magazines is overhung by a series of shelves 204 on which the rear portions of the enclosures delivered from the magazines rest temporarily, when their forward ends are against the gauge 179. These shelves or shields prevent the forward end of an enclosure in the act of being forwarded by the rolls striking the edge of an enclosure or pile of enclosures on the gatherer. When the enclosures are advanced by the gatherer in the direction at right angles to the direction in which they were delivered to the gatherer, the rear portions of the enclosures pass off the ends 205 of the shelves and under the ends 206, which are flared upward.

The table 14 is provided with longitudinal slots 207 into or through which the fingers 182 may project when in the position for pushing. The edges of these slots nearer the enclosure magazines are inclined slightly upward, while the far edges are inclined slightly downward, to prevent the enclosures catching in the slots when the enclosures are delivered onto the gatherer.

The collections of enclosures which are thus made and delivered to the loading platform are moved into the envelopes by means acting in unison with the gatherer, and in the same direction. A transverse rock-shaft 208 is journaled at one end in a forward bracket 209 on the reciprocating slide carriage 185 of the gatherer, its opposite end having a roller 210 which travels on the bridge 134 heretofore mentioned. This rock-shaft carries a set of pusher fingers 211, preferably hooked and arranged to trail after the rock-shaft in the forward, pushing movement. A link 212 connects a crank arm 213 on this shaft with the bar 200 of the means that automatically raises and lowers the gatherer pushers 182, causing the loading pushers 211 to be shifted from active to idle positions and vice-versa at the proper times, in correspondence with the shifting of the gatherer fingers.

The pusher or pushers 211 operate over the loading platform, and on the forward strokes are held down close to the platform by the action of the spring 202. The platform is provided with a number of parallel ridges 214 forming the surface on which the collection of enclosures rests, the tips of the fingers operating in the depressions between the ridges so as to catch all the enclosures and not ride over them. The fingers 211 are independently adjustable along the rock-shaft 208 and can be set at any positions by set-screws 215, in order to accommodate different widths.

The loader or inserter, at the end of the back stroke, moves down behind the collection of enclosures last advanced onto the loading platform by the foremost pusher 182 of the gatherer, and on the succeeding forward stroke shoves the collection across the platform and into the waiting envelope. The loading fingers then rise out of the way, and travel quickly back in concert with the gatherer pushers for a fresh operation.

Novel means are also provided for guiding the insertion of the charge into the envelope. This means acts as a guide which enters the envelope so as to form with the front wall of the envelope a throat through which the enclosure matter is conducted into the envelope. By arranging the guide so that it is freely yielding away from the front wall of the envelope the enclosure charge is enabled to expand the throat according to its own thickness, so that the entering matter practically opens the envelope for its entrance to an extent determined by its own requirement. This plan has the advantage, among others, that it does not shorten the envelope by spreading it open wider than is necessary, or in any way reduce the length of the space through which the enclosures move into the envelope.

In the illustrated embodiment a rock-shaft 216 is mounted in fixed brackets 217 at opposite sides of the loading platform, toward the rear. This rock-shaft is operated periodically by a cam 218 on the shaft 193, this cam acting upon a roller 219 on a lever 220, which is fulcrumed at 221 and is connected by a link 222 with a gear segment 223, which meshes a pinion 224 on the shaft. The cam actuates the rock-shaft in one direction, the roller being held against the cam, and the rock-shaft and the connected parts being returned in the opposite direction, by springs 225 and 226.

A number of crank-arms 227 are fixed on the shaft 216 by set-screws 228, so that, like the loader fingers 211, these parts can be adjusted laterally for different widths. Flat blade fingers 145 are pivoted at their rear ends to the said crank arms, the pivots being marked 230, and extend forwardly over the loading platform or surface at a low or very acute angle thereto. The forward ends of these blades rest by gravity upon the loading platform or the deck portion 139, which constitutes a part of the same general supporting surface, and the blades are moved back and forth by the oscillation of the shaft 216, the operation of this shaft being so timed that the blades slide into the mouth of the envelope just in advance of the time when the enclosure matter is pushed beneath them into the mouth of the envelope, and recede from the envelope before the latter is moved onward from the station. The blades thus constitute a top guide bridging the edge of the back of the envelope, so that the enclosure matter can not strike that edge. The pivots 230 permit the blades to be raised freely by the entering matter, thereby expanding the throat to the extent that is needful. Naturally, the blades may be flexible in themselves. The guide would not necessarily have to consist of a number of separate blades; but that construction permits of adjustment, and also allows the members of the loading pusher 211 to operate in the spaces between the blades, and, in general, the use of a plurality of blades makes for greater flexibility and efficiency.

The blades 145 also serve the purpose of keeping the envelope from being displaced from loading position, as by the travel beneath it of the gripper 157 returning to engage another envelope.

The type of envelope known as "penny-savers" presents a special difficulty for mechanical inserting or loading. These envelopes have an unsealed end flap, which permits matter to be mailed at the third class rate with the main flap sealed, giving a better appearance and greater security than when the main flap is left unsealed. In order to make the loading of such envelopes reliable, the invention includes a device 231 disposed adjacent the loading station, the function of this device being to hold or restrain the loose end flap of such envelopes so that they may not be thrust out of the envelopes by the insertion of the enclosures, especially when fairly bulky loads are introduced.

In the simplest embodiment, this device comprises a finger or arm mounted on or adjacent the guide 116 at the loading station, and adapted to bear lightly by gravity or spring pressure on the back of the envelope at the end flap region. In the particular construction shown the arm is held loosely by a pin 232, with the arm overhanging the edge of the guide, so as to rest on the envelopes brought beneath it and to be capable of movement up and down. A spring 233 may be arranged over the arm.

The envelope, having been loaded, is carried endwise away from the loading station by the gripper 158, as previously described. The combined loading platform and moistener rises at this time, so that the flap moves freely out from under it. In this movement the flap encounters the horn or guide 12, which turns the moistened flap over upon or toward the back of the envelope. This guide is fixed to the deck of the machine.

The loaded envelope is carried into the bottom of a receiving stack having uprights 234, 234, 235, 235 forming a skeleton enclosure on an extension 236 of the deck of the machine. This holder has an open entrance for the envelopes at the end toward the loading station, and the flanges 336 of the members 235 at the far end provide a back for the stack to abut against.

Means are provided for automatically pressing the envelopes thus introduced upward against the bottom of the stack of articles and for raising the stack, this operation pressing the moistened flap against the back of its envelope and resulting in the envelope becoming sealed. The plan is such as to provide a free space beneath the stack of envelopes into which each successive freshly loaded and moistened envelope is carried horizontally. In the particular construction illustrated two rock-shafts 237 are journaled in brackets 238 and 239, the shafts extending longitudinally at opposite sides of the stack. On these shafts are arms 240 having sub-arms 241 pivoted thereto at 242. Abutments 243 on the arms 240 limit the pivotal movement of the arms 241 thereon in one direction. The construction provides jointed scooping fingers adapted to move into the bottom of the magazine from opposite sides and lift, then to descend and move outward. When the fingers are lowered, the sections 241 ride on the surface of the deck.

The shafts 237 have pinions 244 at one end, these pinions being meshed by rack segments 245 on levers 246, which are connected by links 249 with a lever 250, said lever being connected by a link 247 with a lever 248 having a roller 251 which bears on a cam 252 on the shaft 151. This cam is so arranged as to rock the shafts 237 in directions to cause the fingers to lift or throw upward each successive loaded and moistened envelope just after it is delivered into the stack holder, and then to permit the shafts to rock in the reverse direction so as to move the fingers out of the way of the next envelope. A spring 253 moves the mechanism in this sense when the roller rolls down on the low point of the cam.

Elevations 254 on the deck at the base of the stack by raising the envelope somewhat off the deck make it easier for the fingers to pass under the envelope.

The lifting devices 240, 241 are advantageously located nearer the open end of the stack holder than the back end, which is to be considered as being closed by the flanges 236. This results in raising the envelopes in a tilting manner, keeping the envelopes against said back. The devices may be adjusted to various positions along the shafts 237 and set thereon by screws 255, in order that they may be appropriately positioned for different lengths of envelopes.

Catches 256 are provided for supporting the stack above the deck, so as to leave the space into which the successive freshly loaded and moistened envelopes are introduced. The specific form and arrangement of these catches or supports may be varied. A simple and effective construction is one in which the catches are in the form of upwardly and inwardly inclined struts pivoted at 257 to brackets 258 on the deck at opposite sides of the stack holder. The struts enter well within the confines of the holder, and, by virtue of their inclination and pivotal or yielding mounting, will spread automatically as each envelope is shoved up between them, and will come in automatically beneath the envelope as soon as it is raised above them, thereby supporting this envelope and the entire stack against dropping. Abutments 259 on the lower portions of the catches rest upon the deck so as normally to sustain the catches at the inclinations shown in Fig. 2.

The form of lifter illustrated is simple and effective and therefore preferred, but the lifting means may be widely varied. It is believed to be new in this machine to deliver the envelopes to the bottom of a stack and press or lift them upward. This pressing of the envelope upward against the bottom of the stack is a positive agency in sealing. The repeated operation of the lifter at a fairly rapid rate produces a succession of thrusts or impacts from beneath, jolting the stack so as to complete the sealing of the envelopes in a very effective manner.

It will be understood that the various parts of the machine are susceptible of considerable modifications, that the invention is not limited to the precise form, arrangement and operation, that parts may be omitted or added, and that equivalents may be substituted. The language of the claims is intended to cover all the generic and specific features of the invention and all statements of the scope of the invention which as a matter of language may be said to fall therebetween.

I claim:

1. A machine of the character described having a plurality of enclosure magazines, an envelope magazine, means for presenting the envelopes successively for loading, means for delivering enclosures simultaneously from the enclosure magazines at different points, and mechanism operative to translate the delivered enclosures so as to form collections by addition resulting from successive deliveries, and means forming part of the same mechanism operative to positively insert the successive collections into the envelopes by further translational movement in the same direction.

2. A machine of the character described having a plurality of enclosure magazines, an envelope magazine, means for presenting the envelopes successively for loading, means for delivering enclosures simultaneously from the enclosure magazines at different points, gathering means operative to translate the delivered enclosures so that successive collections are formed by addition resulting from successive deliveries, and positive loading means operative to insert each successive collection into its envelope by further translational movement in the same direction.

3. A machine of the character described having a plurality of enclosure magazines, an envelope magazine, means for presenting the envelopes successively for loading, means for feeding enclosures simultaneously from the enclosure magazines in generally parallel directions to different points, means operative to translate the enclosures in a direction at right angles to that in which they are fed so that successive collections are formed and means operative by further movement in this direction to positively insert the successively formed collections into the envelopes.

4. A machine of the character described having a plurality of enclosure magazines, an envelope magazine, means for presenting the envelopes successively for loading, means for delivering enclosures simultaneously from the enclosure magazines at different points, means for translating the delivered enclosures so that successive collections are formed by addition resulting from successive deliveries, and positive means for inserting the collections thus formed into the envelopes.

5. A machine of the kind described characterized by a plurality of pushing devices one behind another, and means to operate the said devices in one and the same timed operation to translate step by step enclosures delivered from a plurality of magazines, to form successive collections and to positively insert the collections into envelopes.

6. A machine of the kind described characterized by a plurality of reciprocatory pushing devices one behind another, and means to operate the said devices in the same timed operation to translate step by step enclosures delivered from a plurality of magazines so as to form successive collections and to insert the collections into envelopes.

7. In a machine of the kind described, a row of magazines, an upwardly facing substantially horizontal gathering support in front of said magazines, a stop, means for propelling sheet articles of various sizes freely across said support to different positions against said stop, means for translating the articles along the gathering support in a direction at a right angle to the direction in which they were propelled onto the gathering support in order to form collections of the articles, means for presenting an envelope to receive each collection, and means for inserting the collections into the envelopes.

8. In a machine of the kind described, an upwardly facing substantially horizontal gathering support, a stop, means for propelling sheet articles from a number of supplies freely across different portions of said support to said stop, means for translating the articles along the gathering support in a direction at a right angle to the direction in which they were propelled onto the gathering support in order to form collections of the articles, means for presenting an envelope to receive each collection, and means for inserting the collections into the envelopes.

9. In a machine of the kind described, an upwardly facing gathering support, alining and flexible retaining means, means for shooting sheet articles from a number of supplies across different portions of said support to said alining and flexible retaining means, and means for translating the articles.

10. In a machine of the kind described, a visible gathering table, means for delivering articles from the side onto different portions of said table, means for translating the articles step by step along said table, and flexible overthrow checking means cooperative with said table.

11. In a machine of the kind described, gathering means comprising a longitudinally slotted gathering table, means for delivering sheet articles from the side onto different portions of said table, a plurality of transverse sets of pusher fingers, means for reciprocating said finger sets lengthwise of the slots, and means for automatically raising and lowering the fingers.

12. In a machine of the kind described, a slotted gathering table, a reciprocating carriage movable lengthwise of the table, transverse rockers on said carriage carrying fingers, and stationary means whereby said rockers are controlled.

13. In a machine of the kind described, a plurality of magazines, an upwardly facing gathering support, driven means for feeding articles from the magazines, and rollers arranged in front of the magazines to receive such articles and driven at such ratio as to impart a high linear speed to the articles so as to propel them transversely to separated positions on the gathering support.

14. In a machine of the kind described, a plurality of magazines, an upwardly facing gathering support, driven means for feeding articles from the magazines comprising revoluble feeding elements constructed to drop out of the way after starting the articles, and rollers for receiving the articles and propelling them across said support to positions thereon.

15. In a machine of the kind described, an upwardly facing gathering surface, means for delivering enclosures onto different portions of said surface, means for presenting a succession of open envelopes lying horizontally opposite the end of said surface, and a plurality of pushing devices one behind another, and means to operate said devices for translating the enclosures in a single direction to gather successive collections by addition resulting from successive deliveries and to positively insert said collections into the envelopes.

16. In a machine of the kind described, the combination of a translational gatherer adapted to gather successive collections of enclosures delivered from any desired number of supplies, means for presenting a succession of open envelopes, and positive means for inserting the collections into the envelopes.

17. In a machine of the kind described, an upwardly facing gathering support having guard means overhanging one side thereof, means for delivering sheet articles from that side partly onto said support or the articles already thereon, and partly on said guard means, and means for translating the articles to form successive collections, said guard means being arranged to permit the portions of the articles thereon to pass off the guard means onto the articles beneath as the result of the translational movement.

18. A machine of the kind described having a plurality of enclosure magazines, a translational gatherer extending in front of said magazines, means for feeding the enclosures to the gatherer at different points, means for translating successive envelopes horizontally at right angles to the direction of translation of the gatherer to a position to receive the collections of enclosures therefrom and means to insert the collections into the envelopes.

19. A machine of the kind described having a row of enclosure magazines ranged side by side, an envelope magazine at one end of said row of enclosure magazines and facing in a direction at right angles to that in which the enclosure magazines face, a translational gatherer in front of the row of enclosure magazines, means for moving the envelopes one at a time from the envelope magazine in a direction transverse to the flaps and with the bottoms of the envelopes in advance, a flap opener encountered by the flaps as the envelopes emerge from the magazine, and means for translating the successive envelopes endwise with their flaps open to a position opposite the end of the gatherer.

20. In a machine of the kind described, an envelope magazine with means for starting envelopes one at a time therefrom in a direction transverse to the flap and with the bottom edge of the envelope in advance, a flap-opener in front of the magazine, and reciprocatory jaw means adapted to grasp the forward portion of the body of the envelope protruded from the magazine and positively draw the envelope beneath the flap-opener.

21. In a machine of the kind described, the combination of a flap opener adapted to operate upon the flaps of an envelope moving in a direction transverse to the flap, and with the bottom edge of the envelope in advance, and a reciprocatory jaw device adapted to grasp the body of the envelope, positively draw the envelope in relation to the flap opener and release the envelope.

22. In a machine of the kind described, the combination of a flap opener adapted to operate upon the flap of an envelope moving in a direction transverse to the flap and with the bottom edge of the envelope in advance, means for automatically moving said flap opener toward and from the back of the envelope, and a reciprocatory jaw device adapted to grasp the body of the envelope, positively draw the envelope in relation to the flap opener and release the envelope.

23. In a machine of the kind described, an envelope magazine, reciprocatory jaw means for withdrawing the envelopes with their bottom edges in advance, means for opening the flaps of the envelopes, a guide across from the envelope magazine extending at right angles to the reciprocatory movement of said jaw means, means whereby said jaw means is caused to release each envelope with its bottom edge at said guide, and means for moving the envelopes lengthwise of said guide to a loading position.

24. In a machine of the kind described, an envelope magazine, reciprocatory jaw means for withdrawing the envelopes with their bottom edges in advance, means for opening the flaps of the envelopes in the course of such movement, and other reciprocatory jaw means for moving the envelopes thus withdrawn in a direction at right angles to bring the envelopes to a loading station.

25. In a machine of the kind described, an envelope magazine, means for moving envelopes one at a time from the magazine in a direction transverse to the flaps and with their bottom edges in advance, means for opening the flaps of the envelopes as they are thus withdrawn, and means for then moving the envelopes endwise to a loading position.

26. In a machine of the kind described, an envelope magazine, means for moving envelopes one at a time from the magazine in a direction transverse to the flaps and with their bottom edges in advance, means for opening the flaps of the envelopes as they are thus withdrawn, means for then moving the envelopes endwise to a loading position, and means for further turning back the opened flaps of the envelopes as they are moved endwise to the loading position.

27. In a machine of the kind described, a loading platform, a moistener beneath said platform, means for bringing an envelope opposite said platform with its flap beneath the same in contact with the moistener, and means for pushing mail matter off said platform into the envelope.

28. In a machine of the kind described, a loading platform, a moistener beneath said platform, means for automatically raising and lowering said platform, means for bringing an envelope opposite said platform with its flap beneath the same in contact with the moistener, and means for pushing mail matter off said platform into the envelope.

29. In a machine of the kind described, a ridged loading platform, a moistener beneath said platform, means for bringing an envelope opposite said platform with its flap beneath the same in contact with the moistener, and fingers operative between the ridges of the platform to push mail matter from the platform into the envelope.

30. In a machine of the kind described, means for moving envelopes endwise to and from a loading position comprising a double reciprocatory jaw mechanism.

31. In a machine of the kind described, means for moving envelopes endwise to and from a loading position comprising a reciprocatory carriage and two sets of gripping jaws thereon arranged one to draw the envelope to said position and the other to draw it away.

32. In a machine of the kind described, means for moving envelopes endwise to and from a loading position comprising two sets of gripping jaws, means for reciprocating said sets of jaws in unison, and means for opening and closing the jaws.

33. In a machine of the kind described, the combination of means for pushing mail matter into envelopes, a stacker adjacent the loading position, and a double reciprocatory jaw mechanism adapted to grasp and release the envelopes and draw them endwise to the loading position and thence to the stacker.

34. In a machine of the kind described, loading means, a guide adjustable transversely to itself relatively to said loading means, means for moving envelopes endwise along said guide, a jaw device for drawing the envelopes with their lower edges in advance to said guide, and a jaw opener cooperative with said device and mounted with said adjustable guide.

35. In envelope loading means, means comprising a plurality of independently yielding fingers movable endwise into and out of an open envelope which is expansible by the mail matter as the latter is inserted beneath said fingers.

36. In envelope loading means, a plurality of fingers movable into and out of an open envelope and between which and the front wall of the envelope the mail matter is introduced, and means with which said fingers are independently flexibly connected for moving the same endwise.

37. In envelope loading means, a rock-shaft opposite a loading position, and blade means flexibly connected to said rock-shaft so as to be thrust endwise into an open envelope to guide the mail matter between said blade means and the front wall of the envelope.

38. In a machine of the kind described wherein the envelopes are supported flatly with their backs up and the flaps turned back while being loaded, reciprocatory blade means movable endwise into and out of the envelope, said blade means comprising a plurality of blades adjustable in different lateral spacings, and means for inserting the mail matter into the envelope beneath said blade means.

39. In a machine of the kind described wherein the envelopes are supported flatly with their backs up and the flaps turned back while being loaded, reciprocatory blade means movable into and out of the envelope, said blade means being supported and operated so as to converge forwardly at an inclination to the underlying surface with the forward end of the blade means riding gravitationally on such surface.

40. In a machine of the kind described, a movable loading platform constituting means for keeping an envelope flap out of the way, an envelope support, means for pushing mail matter from said loading platform into an open envelope on said support, and reciprocatory blade means over said loading platform movable forward and rearward into and out of the envelope, said blade means affording a top guide for the mail matter as the latter is inserted into the envelope.

41. In a machine of the kind described, a loading platform, and means for pushing mail matter off said platform into an open envelope, said means comprising a pusher supported and operated for movement forward and rearward over the platform, with means for raising the pusher for its rearward stroke and lowering it for its forward stroke.

42. In a machine of the kind described, a loading platform, and means for pushing mail matter off said platform into an open envelope, said means comprising a pusher supported and operated for movement forward and rearward over the platform, with means for raising the pusher for its rearward stroke and lowering it for its forward stroke, said pusher being in the nature of a dragging hook.

43. In a machine of the kind described, a loading platform having a moistening pad on its under side.

44. In a machine of the kind described, a loading platform having a moistening pad on its under side, and means for raising and lowering said platform.

45. In a machine of the kind described, a loading platform having a moistening pad on its under side, means for raising and lowering said platform, and a support for the flap beneath said platform and pad.

46. In a machine of the kind described, a loading platform having a moistening pad on its under side, means for raising and lowering said platform, and a resilient support for the flap beneath said platform and pad.

47. In a machine of the kind described, the combination of means for bringing an envelope with its flap turned back to a loading station, means for inserting mail matter into the envelope at the loading station, means for moistening the flap while the envelope is at the loading station, a stacker, and means for transferring the loaded envelope from the loading station to the stacker.

48. In a machine of the kind described, means for seizing successive envelopes, drawing them to a position and there releasing them, comprising a reciprocatory carriage, a movable gripping dog carried thereby, said dog having a contact element associated therewith, a shiftable cam member on the carriage for momentarily opening said dog as the cam is shifted from one side to the other of said contact element, and means whereby said cam member is shifted relatively to the carriage in one direction at one position of the carriage and in the opposite direction at another position of the carriage.

49. In a machine of the kind described, means for seizing successive envelopes, drawing them to a position and there releasing them, comprising a reciprocatory carriage, a movable spring-closed gripping dog thereon, said dog having a contact element associated therewith, a slide on the carriage movable longitudinally thereof, a cam on said slide adapted to open said dog momentarily as the cam is shifted from one side to the other of said contact element, and spaced elements outside the carriage to coact with said slide toward opposite ends of the strokes of the carriage.

50. In a machine of the kind described, means for drawing an envelope in a direction transverse to its flap with its bottom edge in advance, a support over which the envelope is drawn, and a flap opener movable toward and from said support to be encountered by the flap, said support presenting a shoulder over which the envelope is drawn, the relations being such that the flap opener in moving toward the back of the envelope flexes the envelope over said shoulder.

51. A machine of the character described comprising, in combination, means for conveying a succession of envelopes, a flap moistening means at or immediately adjacent a loading station, a gatherer adapted to gather enclosures from a series of supplies, and means for inserting the gathered enclosures into the envelopes at the loading station.

52. A machine of the character described comprising, in combination, means for conveying a succession of envelopes, a flap moistening means at or immediately adjacent a loading station, a gatherer adapted to gather enclosures from a series of supplies, means for inserting the gathered enclosures into the envelopes at the loading station, and means for sealing the flaps.

53. In a machine of the character described, a combined loading platform and flap moistener, and means for automatically raising and lowering the same.

54. In a machine of the character described, the combination of means for feeding envelopes to a loading station, means for inserting sheet matter into the envelopes at said station, and a device adjacent said station for retaining an end flap within an envelope while it is being loaded.

55. In a machine of the character described, a device for retaining a loose end flap within an envelope at the loading station.

56. In a machine of the character described, means for supporting an envelope face down at a loading station, and a stationary projection in fixed position above the level of said supporting means against which the face of the envelope bears at said station so as to open the mouth of the envelope in the loading operation.

57. In a machine of the character described, means for conveying envelopes face down in an endwise direction to and away from a loading station with a pause at said station, a movable loading platform and means for actuating the same, and a stop for the envelopes operatively connected with said platform.

58. In a machine wherein envelopes are moved in a direction transverse to the flap with the bottom edge of the envelope in advance, a flap opener in the path of the envelopes comprising a blade extended transversely of such path so as to act on substantially the full length of the gummed flap, means for releasing the envelope with its flap in contact with said blade, and means for thence moving the envelope endwise to a loading position.

59. In a machine of the character described, an envelope magazine from which envelopes are fed face down in a direction transverse to the flap, with the bottom edge of the envelope in advance, a flap raiser immediately in front of said magazine, means for withdrawing the envelopes only far enough to raise the flaps by engagement with said flap raiser, and means for moving the envelopes endwise away from the flap raiser.

60. In a machine of the character described, an envelope magazine from which envelopes are fed face down in a direction transverse to the flap, with the bottom edge of the envelope in advance, a flap raiser immediately in front of said magazine, means for withdrawing the envelopes only far enough to raise the flaps by engagement with said flap raiser, means for moving the envelopes endwise away from the flap raiser, and means for further opening the flaps as the envelopes move in this direction.

61. In a machine of the character described, a raising and lowering loading platform constituting a holder to hold the flap of the envelopes out of the way in loading.

62. In a machine of the character described, a loading platform arranged to receive the envelope flaps beneath it, and means for presenting the envelopes to said platform so as to introduce the flaps thereunder.

63. A machine of the character described, comprising a gatherer, means for feeding enclosures lengthwise simultaneously from a plurality of supply stations to said gatherer, said gatherer operating to translate the enclosures in a direction transverse to their length, means for moving successive envelopes endwise in a direction at right angles to the direction in which the enclosures are translated by the gatherer to bring the envelopes to a loading position, and positive means for inserting the successive collections into the envelopes by further movement in the direction of gathering.

64. A machine of the character described, comprising a gatherer, means for feeding enclosures lengthwise simultaneously from a plurality of supply stations to said gatherer, said gatherer operating to translate the enclosures in a direction transverse to their length, means for feeding envelopes one at a time from an envelope supply in a direction at right angles to their length, means whereby the flap of each envelope is opened at least partially at this time, means for then moving the envelope endwise in a direction at right angles to the direction in which the enclosures are translated by the gatherer to bring the envelopes to a loading position, and positive means for inserting the successive collections into the envelopes by further movement in the direction of gathering.

FLORENCE McCARTHY.